US011803318B2

(12) United States Patent
Tylik et al.

(10) Patent No.: US 11,803,318 B2
(45) Date of Patent: Oct. 31, 2023

(54) ACTIVE-PASSIVE CONFIGURATION FOR SYNCHRONOUS REMOTE REPLICATION IN AN ACTIVE-ACTIVE METRO CLUSTER

(71) Applicant: EMC IP Holding Company LLC, Hopkinton, MA (US)

(72) Inventors: Dmitry Tylik, Westborough, MA (US); Carole Gelotti, Hollis, NH (US); David Meiri, Somerville, MA (US); Girish Sheelvant, Hopkinton, MA (US); Nagasimha Haravu, Apex, NC (US); Aharon Blitzer, Shoham (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/236,231

(22) Filed: Apr. 21, 2021

(65) Prior Publication Data

US 2022/0342548 A1  Oct. 27, 2022

(51) Int. Cl.
*G06F 3/06* (2006.01)
(52) U.S. Cl.
CPC .............. *G06F 3/065* (2013.01); *G06F 3/067* (2013.01); *G06F 3/0613* (2013.01); *G06F 3/0629* (2013.01); *G06F 3/0659* (2013.01)
(58) Field of Classification Search
None
See application file for complete search history.

(56) References Cited

U.S. PATENT DOCUMENTS

| 6,643,795 | B1* | 11/2003 | Sicola | G06F 11/2079 |
| | | | | 714/E11.073 |
| 8,966,211 | B1* | 2/2015 | Arnon | G06F 13/102 |
| | | | | 709/224 |
| 9,176,902 | B1* | 11/2015 | Long | G06F 3/0635 |
| 9,684,576 | B1* | 6/2017 | Natanzon | G06F 11/2058 |
| 10,282,136 | B1* | 5/2019 | Ito | G06F 3/0683 |
| 10,552,060 | B1* | 2/2020 | Don | G06F 3/061 |
| 2002/0188711 | A1* | 12/2002 | Meyer | G06F 11/2089 |
| | | | | 709/224 |
| 2003/0188218 | A1* | 10/2003 | Lubbers | G06F 11/2079 |
| | | | | 714/5.11 |
| 2015/0134880 | A1* | 5/2015 | Danilak | G06F 13/4282 |
| | | | | 711/103 |
| 2016/0036653 | A1* | 2/2016 | Deguchi | G06F 3/0683 |
| | | | | 709/219 |
| 2017/0364426 | A1* | 12/2017 | Blea | G06F 3/065 |
| 2019/0121709 | A1* | 4/2019 | Abouelwafa | G06F 3/061 |

* cited by examiner

*Primary Examiner* — Charles Rones
*Assistant Examiner* — Ralph A Verderamo, III
(74) *Attorney, Agent, or Firm* — DALY CROWLEY MOFFORD & DURKEE, LLP

(57) ABSTRACT

In one aspect, an example methodology implementing the disclosed techniques includes creating, by a first site of a volume that supports active-active bidirectional replication, a local copy of the volume, the local copy of the volume configured to be active. The method also includes enabling, by the first site of the volume, bidirectional write input/output (I/O) mirroring with a second site of the volume. The method further includes, by the second site of the volume, creating a remote copy of the volume, the remote copy of the volume configured to be passive, and enabling bidirectional write I/O mirroring with the first site of the volume.

18 Claims, 19 Drawing Sheets

ACTIVE-PASSIVE CONFIGURATION FOR SYNCHRONOUS REMOTE REPLICATION IN AN ACTIVE-ACTIVE METRO CLUSTER

BACKGROUND

Multi-site storage system configurations are becoming more common with the increasing use of public and private clouds. In such configurations, a multi-site storage system may include storage devices (e.g., storage arrays) into which data may be entered (e.g., written), and from which data may be obtained (e.g., read). These storage devices may be situated on the same physical location or in one or more physically different locations.

One particular example of a multi-site storage system is a metro cluster. In general, a metro cluster is a storage array deployment in which two storage arrays, typically deployed in two different data centers or two server rooms within the same data center, cooperate to expose a single "metro" storage resource (e.g., volume, volume group, or file system) to application hosts. Thus, the hosts and the applications running on the hosts perceive two storage resources hosted by the two storage arrays as a single storage resource. Examples of primary metro cluster use cases include high availability (HA) and disaster avoidance, resource balancing across data centers, and storage migration.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method to configure a volume that supports active-active bidirectional replication in an active-passive mode includes, by a first site of the volume, creating a local copy of the volume, the local copy of the volume configured to be active, and enabling bidirectional write input/output (I/O) mirroring with a second site of the volume. The method also includes, by the second site of the volume, creating a remote copy of the volume, the remote copy of the volume configured to be passive, and enabling bidirectional write I/O mirroring with the first site of the volume.

In some embodiments, the method further includes exposing, by the first site of the volume, the local copy of the volume to one or more hosts.

In some embodiments, the method further includes exposing, by the second site of the volume, the remote copy of the volume to one or more hosts.

In some embodiments, the creating, by the second site of the volume, a remote copy of the volume is in response to a request from the first site to create the volume on the second site.

In some embodiments, the method further includes mapping, by the second site of the volume, the remote copy of the volume to a host with no write access.

In some embodiments, the method further includes, responsive to a request to reconfigure the active-passive volume to an active-active volume, reconfiguring, by the second site of the volume, the remote copy of the volume to be active.

In some embodiments, the method further includes, responsive to a request to configure the remote copy of the volume on the second site as preferred, by the first site of the volume, stopping acceptance of new host I/O requests, draining pending host I/O requests, and switching paths on the first site to disable write access. The method also includes switching, by the second site of the volume, paths on the second site to enable write access.

In some embodiments, the method further includes, responsive to a request to promote the remote copy of the volume on the second site, switching, by the second site of the volume, paths on the second site to enable write access.

In some embodiments, the method further includes, responsive to a request to configure the promoted remote copy of the volume on the second site as preferred, sending, by the second site of the volume to the first site of the volume, a request to copy accumulated delta on the first site. The method also includes, responsive to the request to copy the accumulated delta on the first site, by the first site of the volume, copying the accumulated delta to the volume on the first site and configuring paths on the first site to disable write access.

According to another illustrative embodiment provided to illustrate the broader concepts described herein, a computer program product includes one or more non-transitory machine-readable mediums encoding instructions that when executed by one or more processors cause a process to be carried out for configuring a volume that supports active-active bidirectional replication in an active-passive mode. The process includes, by a first site of the volume, creating a local copy of the volume, the local copy of the volume configured to be active, and enabling bidirectional write input/output (I/O) mirroring with a second site of the volume. The process also includes, by the second site of the volume, creating a remote copy of the volume, the remote copy of the volume configured to be passive, and enabling bidirectional write I/O mirroring with the first site of the volume.

In some embodiments, the process further includes exposing, by the first site of the volume, the local copy of the volume to one or more hosts.

In some embodiments, the process further includes exposing, by the second site of the volume, the remote copy of the volume to one or more hosts.

In some embodiments, the creating, by the second site of the volume, a remote copy of the volume is in response to a request from the first site to create the volume on the second site.

In some embodiments, the process further includes mapping, by the second site of the volume, the remote copy of the volume to a host with no write access.

In some embodiments, the process further includes, responsive to a request to reconfigure the active-passive volume to an active-active volume, reconfiguring, by the second site of the volume, the remote copy of the volume to be active.

In some embodiments, the process further includes, responsive to a request to configure the remote copy of the volume on the second site as preferred, by the first site of the volume, stopping acceptance of new host I/O requests, draining pending host I/O requests, and switching paths on the first site to disable write access. The process also includes switching, by the second site of the volume, paths on the second site to enable write access.

In some embodiments, the process further includes, responsive to a request to promote the remote copy of the volume on the second site, switching, by the second site of the volume, paths on the second site to enable write access.

In some embodiments, the process further includes, responsive to a request to configure the promoted remote copy of the volume on the second site as preferred, sending, by the second site of the volume to the first site of the volume, a request to copy accumulated delta on the first site. The process also includes, responsive to the request to copy the accumulated delta on the first site, by the first site of the volume, copying the accumulated delta to the volume on the first site and configuring paths on the first site to disable write access.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to create, by a first site of the volume that supports active-active bidirectional replication, a local copy of the volume, the local copy of the volume configured to be active. Execution of the instructions also causes the one or more processors to enable, by the first site of the volume, bidirectional write input/output (I/O) mirroring with a second site of the volume. Execution of the instructions further causes the one or more processors to, by the second site of the volume, create a remote copy of the volume, the remote copy of the volume configured to be passive, and enable bidirectional write I/O mirroring with the first site of the volume.

In some embodiments, execution of the instructions further causes the one or more processors to expose, by the first site of the volume, the local copy of the volume to one or more hosts.

In some embodiments, execution of the instructions further causes the one or more processors to expose, by the second site of the volume, the remote copy of the volume to one or more hosts.

In some embodiments, execution of the instructions further causes the one or more processors to map, by the second site of the volume, the remote copy of the volume to a host with no write access.

In some embodiments, execution of the instructions further causes the one or more processors to, responsive to a request to reconfigure the active-passive volume to an active-active volume, reconfigure, by the second site of the volume, the remote copy of the volume to be active.

In some embodiments, execution of the instructions further causes the one or more processors to, responsive to a request to configure the remote copy of the volume on the second site as preferred, by the first site of the volume, stop acceptance of new host I/O requests, drain pending host I/O requests, and switch paths on the first site to disable write access. Execution of the instructions further causes the one or more processors to switch, by the second site of the volume, paths on the second site to enable write access.

In some embodiments, execution of the instructions further causes the one or more processors to, responsive to a request to promote the remote copy of the volume on the second site, switch, by the second site of the volume, paths on the second site to enable write access.

In some embodiments, execution of the instructions further causes the one or more processors to, responsive to a request to configure the promoted remote copy of the volume on the second site as preferred, send, by the second site of the volume to the first site of the volume, a request to copy accumulated delta on the first site. Execution of the instructions further causes the one or more processors to, responsive to the request to copy the accumulated delta on the first site, by the first site of the volume, copy the accumulated delta to the volume on the first site and configure paths on the first site to disable write access.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
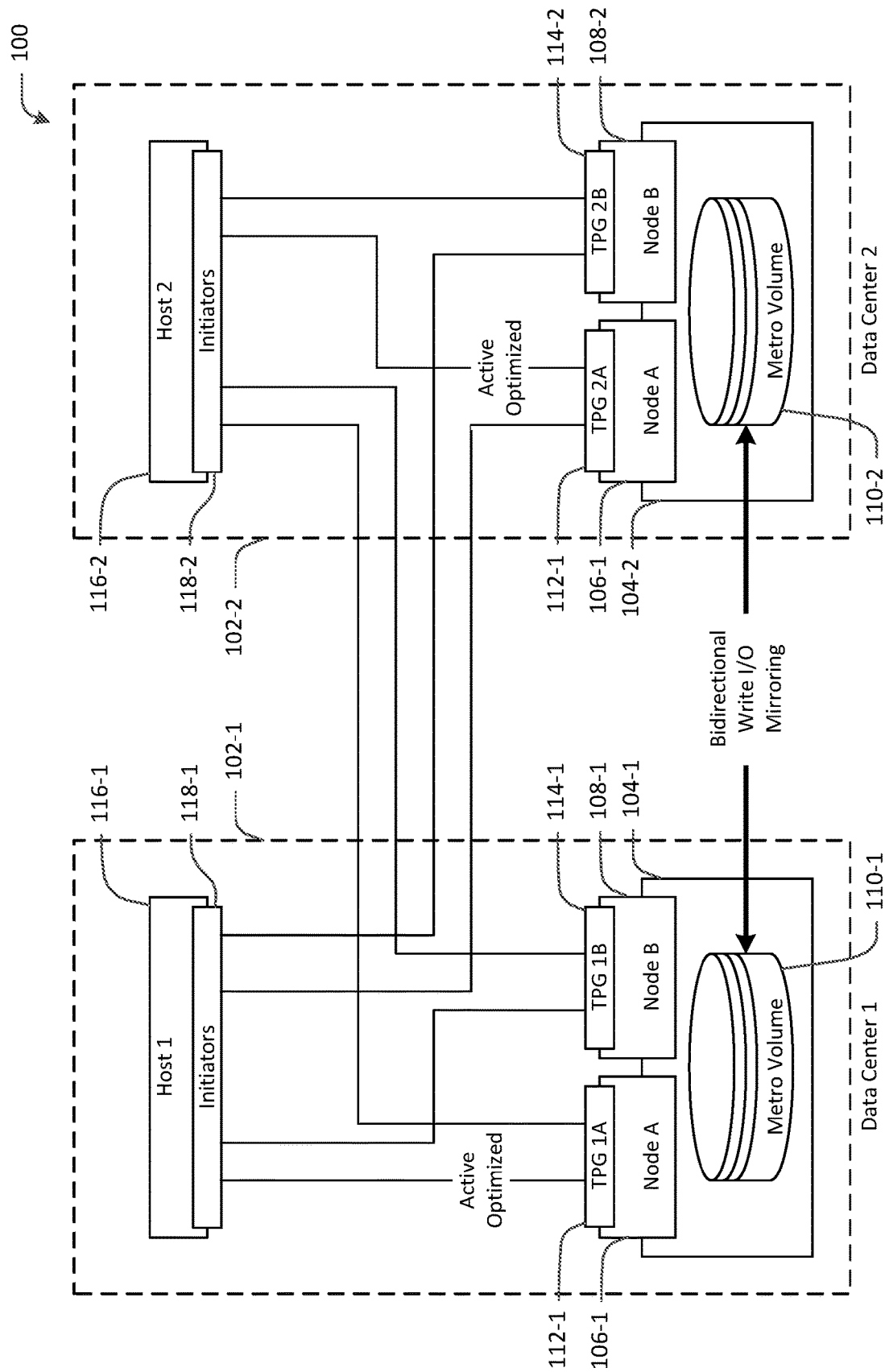
FIG. 1 illustrates a distributed storage environment in which embodiments of the techniques disclosed herein may be implemented.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data, as well as issue requests for configuration of storage units in the storage system. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium. Also, a storage unit may refer to any unit of storage including those described above with respect to the storage devices, as well as including storage volumes, logical drives, containers, or any unit of storage exposed to a client or application. A storage volume may be a logical unit of storage that is independently identifiable and addressable by a storage system.

As used herein, the term "I/O request" or simply "I/O" refers, in addition to its plain and ordinary meaning, to an input or output request, such as a data read or data write request or a request to configure and/or update a storage unit feature. A feature may refer to any service configurable for the storage system.

As used herein, the term "storage device" refers, in addition to its plain and ordinary meaning, to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

As used herein, the term "storage array" (sometimes referred to as a disk array) refers, in addition to its ordinary meaning, to a data storage system that is used for block-based, file-based or object storage, where storage arrays can include, for example, dedicated storage hardware that contains spinning hard disk drives (HDDs), solid-state disk drives, and/or all-flash drives.

As used herein, the term "data storage entity" refers, in addition to its ordinary meaning, to any one or more of a file system, object storage, a virtualized device, a logical unit, a logical unit number, a logical volume, a logical device, a physical device, and/or a storage medium.

Asymmetric Logical Unit Access (ALUA) features of Small Computer System Interface (SCSI) (also known as SCSI Target Port Groups or Target Port Group Support) is a standard protocol for identifying optimized paths between a storage system and a host. ALUA enables an initiator to query a target about path attributes, such as primary path and secondary path. It also allows the target to communicate events back to the initiator. The SCSI and ALUA commands can be used across any of a number of transports, such as Fibre Channel (FC) or Internet SCSI (iSCSI), for example.

Non-Volatile Memory Express over Fabric (NVMe-oF) is a technology specification designed to enable nonvolatile memory express message-based commands to transfer data between a host computer and a target solid-state storage device or system over a network, such as Ethernet, Fibre Channel (FC) or InfiniBand.

Asymmetric Namespace Access (ANA) is an NVMe technology specification designed to enable access to a given namespace (e.g., a volume presented from the storage to a host).

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

As noted above, a metro cluster is a storage array deployment that includes two storage arrays. In such configurations, the metro cluster storage arrays may be deployed in two different data centers or two server rooms within the same data center. These metro cluster storage arrays may operate in a "symmetric active-active" configuration or mode in which both storage arrays are equal in terms of input/output (I/O) processing and process all read I/O locally, while synchronously mirroring (copying) all write I/O to the peer (sometimes referred to as bidirectional write I/O mirroring or bidirectional remote replication). However, the bidirectional remote replication provided by a metro cluster may not be desired and/or needed for all use cases and/or applications. For instance, synchronous remote replication in a single direction may be sufficient for many use cases, such as disaster recovery where a first storage array located in a first data center is used to run the production copy of an application and synchronously replicates all incoming write I/O to a second storage array located in a second data center. Synchronous data replication allows for ensuring that the disaster recovery copy of the data on the second storage array is identical to the production copy of the data on the first storage array. Here, if the first storage array fails and an application is failed over to run from the second storage array, the application continues operating from the same data. This provides Recovery Point Objective (RPO) of zero (RPO=0) and means no data loss on application failover in case of a disaster, which is critical for some organizations to ensure their business continuity. Therefore, it may be desirable if a metro cluster that supports active-active bidirectional remote replication can be configurable for both use cases that need active-active bidirectional remote replication and for use cases that need single direction synchronous remote replication. Also, some applications and file systems may not support the active-active bidirectional remote replication configuration, but still require no data loss (i.e., RPO=0) and near-zero recovery (i.e., Recovery Time Objective (RTO) is near-zero). Thus, having the ability to specify an active-passive configuration with automatic recovery options in a metro cluster environment may be beneficial in that this will allow for providing a desired protection policy for a wider range of applications and file systems (e.g., applications and file systems that do not support the active-active configuration). Embodiments of the present disclosure provide solutions to these and other technical problems described herein.

Embodiments of the concepts, techniques, and structures disclosed herein are directed to implementing an active-passive synchronous remote replication mode in a metro cluster that supports active-active bidirectional replication. A metro cluster implementing the active-passive synchronous remote replication mode supports synchronous remote replication use cases and automatic recovery. In the active-passive synchronous remote replication mode, a preferred side of a metro volume or volume group (e.g., one of the two storage arrays) is active and services host I/O, and the non-preferred side of the metro volume or volume group (e.g., the other one of the two storage arrays) is passive, without write access mode and, thus, does not service host I/O. Note that a passive volume or volume group does not service host I/O even if mapped and the host issues (e.g., accidentally issues) read or write I/O requests. For example, in implementations that support SCSI ALUA, the non-preferred side of the metro volume or volume group can be set to passive, without write access mode and therefore does not service host I/O, by setting the paths on the non-preferred side to Unavailable. As another example, in implementations that support NVMe-oF ANA, the non-preferred side of the metro volume or volume group can be set to passive, without write access mode and therefore does not service host I/O, by setting ANA Group to Inaccessible. The metro cluster implemented to support the active-passive synchronous remote replication mode is able to satisfy a data protection policy of no data loss (i.e., RPO is 0) and near-zero recovery (i.e., RTO is near-zero).

Turning now to the figures, FIG. 1 illustrates a distributed storage environment 100 in which embodiments of the techniques disclosed herein may be implemented. Distributed storage environment 100 may be associated with an enterprise, a service provider, a storage vendor, or other type of organization. Storage environment 100 includes a first data center (data center 1) 102-1 and a second data center (data center 2) 102-2. In accordance with various embodiments, storage environment 100 may represent a metro cluster configuration in which symmetric active-active access to storage resources (e.g., volume, volume group, file system, and the like) with bidirectional write I/O mirroring can be achieved. In such configurations, data center 102-1 and data center 102-2 may be located remotely from one another, for example, in different rooms of a building, different buildings, or other locations in which the distance between data center 102-1 and data center 102-2 is on the order of metropolitan distances (e.g., approximately 50 to 100 kilometers or 30 to 60 miles). While only two data centers are illustrated in FIG. 1, it will be appreciated that storage environment 100 may include any number of data centers. The network that interconnects data center 102-1 and data center 102-2 may include any type of high speed network or combination of such networks, such as a storage area network (SAN), a local area network (LAN), and/or some other type of network, for example.

As shown, data center 102-1 includes a data storage system 104-1, which further includes a first node (Node A) 106-1, a second node (Node B) 108-1, and storage (metro volume) 110-1. Similarly, data center 102-2 includes a data storage system 104-2, which further includes a first node (Node A) 106-2, a second node (Node B) 108-2, and storage (metro volume) 110-2. An example of data storage system 104 includes Dell EMC PowerStore, though embodiments are not so limited. Data storage system 104-1 and data storage system 104-2 may be communicably coupled to one another via a network (not shown). The network that interconnects data storage systems 104-1, 104-2 may include any type of high speed network or combination of such networks, such as a storage area network (SAN), a local area network (LAN), and/or some other type of network, for example. Storage 110-1, 110-2 may be provided, for example, in the form of hard disk drives, solid state drives, flash drives, storage arrays (e.g., Redundant Array of Independent Disks (RAID)), and/or other storage devices.

In an example implementation, nodes 106-1, 108-1 form one storage controller pair and work in a coordinated manner to provide the processing resources for performing storage operations and servicing input/output (I/O) between storage 104-1 and hosts. Similarly, nodes 106-2, 108-2 form one storage controller pair and work in a coordinated manner to provide the processing resources for performing storage operations and servicing I/O between storage 104-2 and hosts. To this end, nodes 106-1, 108-1 in data storage system 104-1 may be communicably coupled to one another via a high speed interconnect (e.g., PCI Express). Similarly, nodes 106-2, 108-2 in data storage system 104-2 may be communicably coupled to one another via a high speed interconnect (e.g., PCI Express). Individual nodes 106-1, 108-1 in data storage system 104-1 may be communicably coupled to the individual nodes 106-2, 108-2 in data storage system 104-2. While only one storage controller pair is illustrated in each data storage system in FIG. 1, it will be appreciated that each of the data storage systems may include additional storage controller pairs.

Nodes 106-1, 108-1 may be communicably coupled to storage 110-1 of data storage system 104-1 via, for example, iSCSI, Serial Attached SCSI (SAS), or NVMe-oF. Similarly, nodes 106-2, 108-2 may be communicably coupled to storage 110-2 of data storage system 104-2 via, for example, iSCSI, SAS, or NVMe-oF. Nodes 106-1, 108-1 realize the logical unit numbers (LUNs) (e.g., logical units such as volumes) provisioned from storage 110-1, and nodes 106-2, 108-2 realize the LUNs provisioned from storage 110-2. Note that, since each data storage system (e.g., data storage system 104-1 and data storage system 104-2) contains a copy of the LUNs in a symmetric active-active metro cluster configuration, all of the LUNs appear as local LUNs to the front ends of the individual nodes. In other words, the same LUN (e.g., metro volume) is available for host I/O out of the nodes of both data storage systems. To this end, the individual nodes may include one or more ports for establishing paths to the LUNs. The ports may be devices (e.g., iSCSI targets) on storage systems (e.g., data storage system 104-1 and data storage system 104-2) that communicate with storage over Ethernet ports or FC target ports, for example. As shown in FIG. 1, node 106-1 may include a target port group (TPG 1A) 112-1 and node 108-1 may include a target port group (TPG 1B) 114-1. Similarly, node 106-2 may include a target port group (TPG 2A) 112-2 and node 108-2 may include a target port group (TPG 2B) 114-2. Each target port group includes multiple ports that have the same access characteristics to a LUN (e.g., volume). In brief, the access characteristics may define a path to the LUN as Active/Optimized, Active/Non-Optimized, Unavailable, or In-transition.

In an example, as shown in FIG. 1, data center 102-1 may include a host (Host 1) 116-1 and data center 102-2 may include a host (Host 2) 116-2. Host 116-1 can connect to target port groups 112-1, 114-1, 112-2, 114-2 via initiators 118-1. Similarly, host 116-2 can connect to target port groups 112-1, 114-1, 112-2, 114-2 via initiators 118-2. Initiators 118-1, 118-2 can be software iSCSI initiators that communicate with the data storage systems (e.g., data storage systems 104-1, 104-2) over Ethernet ports. In other implementations, initiators 118-1, 118-2 can be FC initiators that communicate with the data storage systems (e.g., data storage systems 104-1, 104-2) over a FC infrastructure. In any case, host 116-1 can use initiator 118-1 to obtain a list of all the target port groups for a LUN (e.g., target port groups 112-1, 114-1, 112-2, 114-2), obtain a target port ID for a specific path, and use this information to organize the paths to the target port group to access the LUN. In this manner, initiators 118-1 allow the LUN (e.g., volume) be mapped to host 116-1. Similarly, host 116-2 can use initiator 118-2 to obtain a list of all the target port groups for the LUN (e.g., target port groups 112-1, 114-1, 112-2, 114-2), obtain a target port ID for a specific path, and use this information to organize the paths to the target port group to access the LUN. As can be seen in FIG. 1, host 116-1 can communicably couple to the individual target port groups 112-1, 114-1, 112-2, 114-2 via respective paths, where one of the paths (i.e., path from host 116-1 to target port group 112-1) is an Active/Optimized path and the remaining paths are Active/Non-optimized paths. Similarly, host 116-2 can communicably couple to the individual target port groups 112-1, 114-1, 112-2, 114-2 via respective paths, where one of the paths (i.e., path from host 116-2 to target port group 112-2) is an Active/Optimized path and the remaining paths are Active/Non-optimized paths. Once the host is connected to the target port group, the host can be mapped to the LUN using storage system management software.

In an example operation, any of the nodes (e.g., any of nodes 106-1, 108-1, 106-2, 108-2) may receive an I/O request directed to a LUN. For example, the I/O request, which may include block-based requests and file-based requests, may be issued by a host (e.g., host 116-1 or 116-2). In the symmetric active-active metro cluster configuration, the specific node that receives the I/O request processes the I/O request it receives locally on its data storage system without the need for forwarding to another node on the peer data storage system. In the case of a write I/O, in addition to processing the write I/O locally on its data storage system, the node synchronously mirrors the write I/O to the peer data storage system to maintain consistency between the two data storage systems (e.g., metro volume) and, more generally, among all the nodes in the metro cluster. For example, assuming that node 106-1 (or node 108-1) receives an write I/O request, node 106-1 (or node 108-1) can process the write I/O locally on data storage system 104-1 and synchronously mirror the write I/O on data storage system 104-2 using either node 106-2 or node 108-2. Similarly, assuming that node 106-2 (or node 108-2) receives a write I/O request, node 106-2 (or node 108-2) can process the write I/O locally on data storage system 104-2 and synchronously mirror the write I/O on data storage system 104-1 using either node 106-1 or node 108-1. Note that, when the metro cluster is in the active-active bidirectional replication configuration or mode, a metro volume may likewise be considered an active-active metro volume. Likewise, when the metro cluster is in the active-passive synchronous remote replication configuration or mode, a metro volume may likewise be considered an active-passive metro volume.

As noted above, bidirectional remote replication provided by the metro cluster may not be desired and/or needed for all use cases and/or applications. Thus, and in accordance with certain of the embodiments disclosed herein, the individual nodes (e.g., nodes 106-1, 108-1, 106-2, 108-2) are programmed with or otherwise includes a storage system management application that is configured with a user interface (e.g., graphical user interface (GUI)) through which a user can configure the metro cluster for either active-active bidirectional remote replication or single direction (i.e., active-passive) synchronous remote replication as described herein. In some such embodiments, the storage system management application may also be configured to communicate via command line (CLI) of various network interfaces such as Representation State Transfer (REST), for example.

Figure 2:
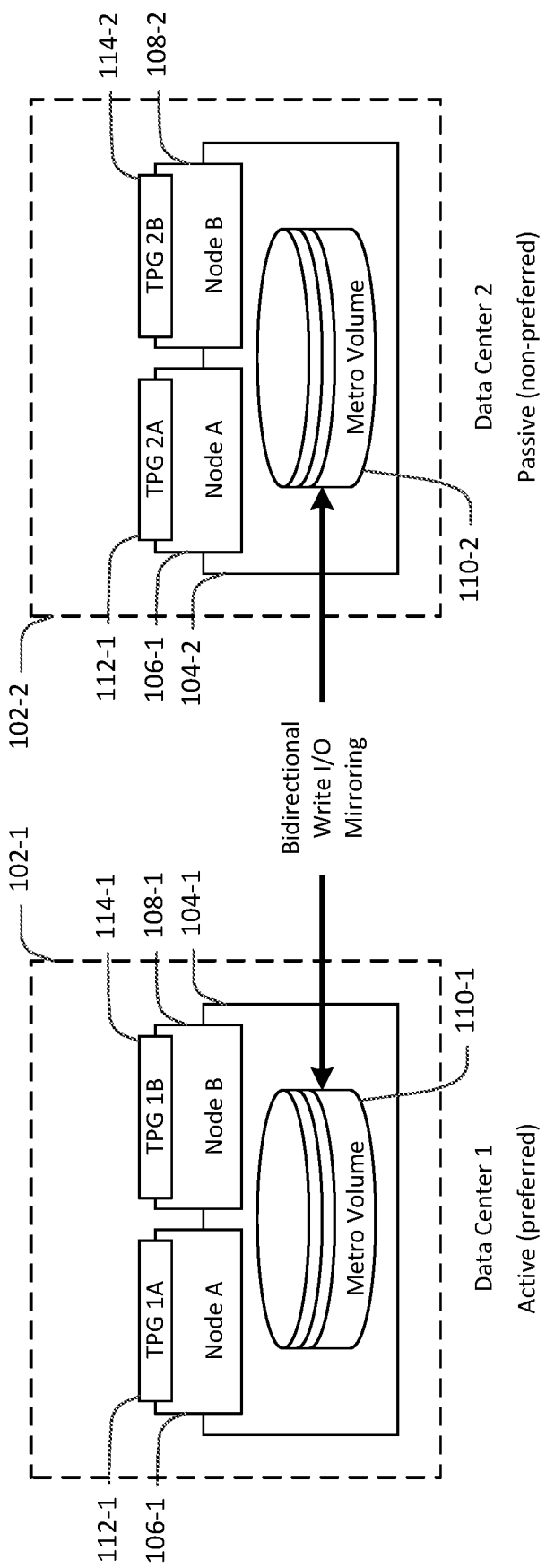
FIG. 2 illustrates the storage environment of FIG. 1 in which no volume is mapped to a host, in accordance with an embodiment of the present disclosure.

Referring to FIG. 2, according to some embodiments, storage environment 100 of FIG. 1 may be in a state in which no volume is mapped to a host. For example, environment 100 may be in such a state when configuring a metro volume between a first site (e.g., data storage system 104-1) and a second site (e.g., data storage system 104-2) in active-passive mode. In this state, an original volume is empty since the volume is not mapped to a host. In this case, since no volumes are mapped to a host, there is no initial synchronization between volumes on data storage system 104-1 and data storage system 104-2. Moreover, when configuring the metro volume in active-passive mode, bi-directional write I/O mirroring can start after the volume is created. As can be seen in FIG. 2, and as will be further described with respect to FIG. 4, the metro volume can be configured in active-passive mode where the metro volume side on data storage system 104-2 is passive. When in the passive mode, the metro volume on data storage system 104-2 is in a write-access disabled state when it is mapped to a host.

Figure 3:
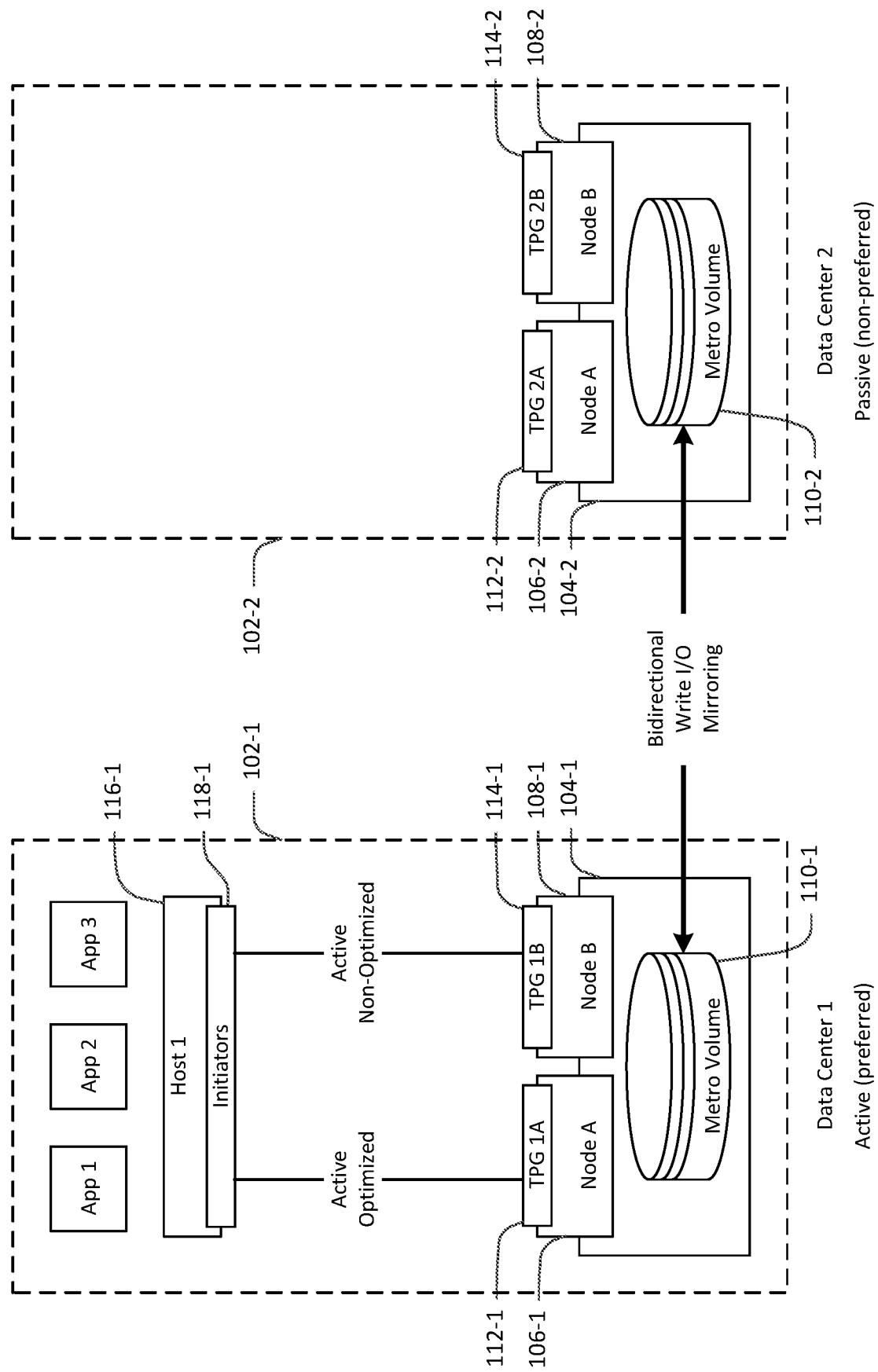
FIG. 3 illustrates the storage environment of FIG. 1 in which a volume is mapped to a host as a metro volume, in accordance with an embodiment of the present disclosure.

Referring to FIG. 3, according to some embodiments, storage environment 100 of FIG. 1 may be in a state in which an existing volume on a data storage system (e.g., data storage system 104-1) is mapped to a host (e.g., host 116-1) as a metro volume. The metro volume may contain application data since it is mapped to host 116-1. For example, similar to the state described previously with respect to FIG. 2, environment 100 may be in such a state when configuring a metro volume between a first site (e.g., data storage system 104-1) and a second site (e.g., data storage system 104-2) in active-passive mode. In this case, when configuring the metro volume in active-passive mode, bi-directional write I/O mirroring can start after initial synchronization from data storage system 104-1 to data storage system 104-2 is completed and both sides of the volume contain identical data. As can be seen in FIG. 3, and as will be further described with respect to FIG. 4, the metro volume can be configured in active-passive mode where the metro volume side on data storage system 104-2 is passive. When in the passive mode, the metro volume on data storage system 104-2 is in a write-access disabled state when it is mapped to a host.

Figure 4:
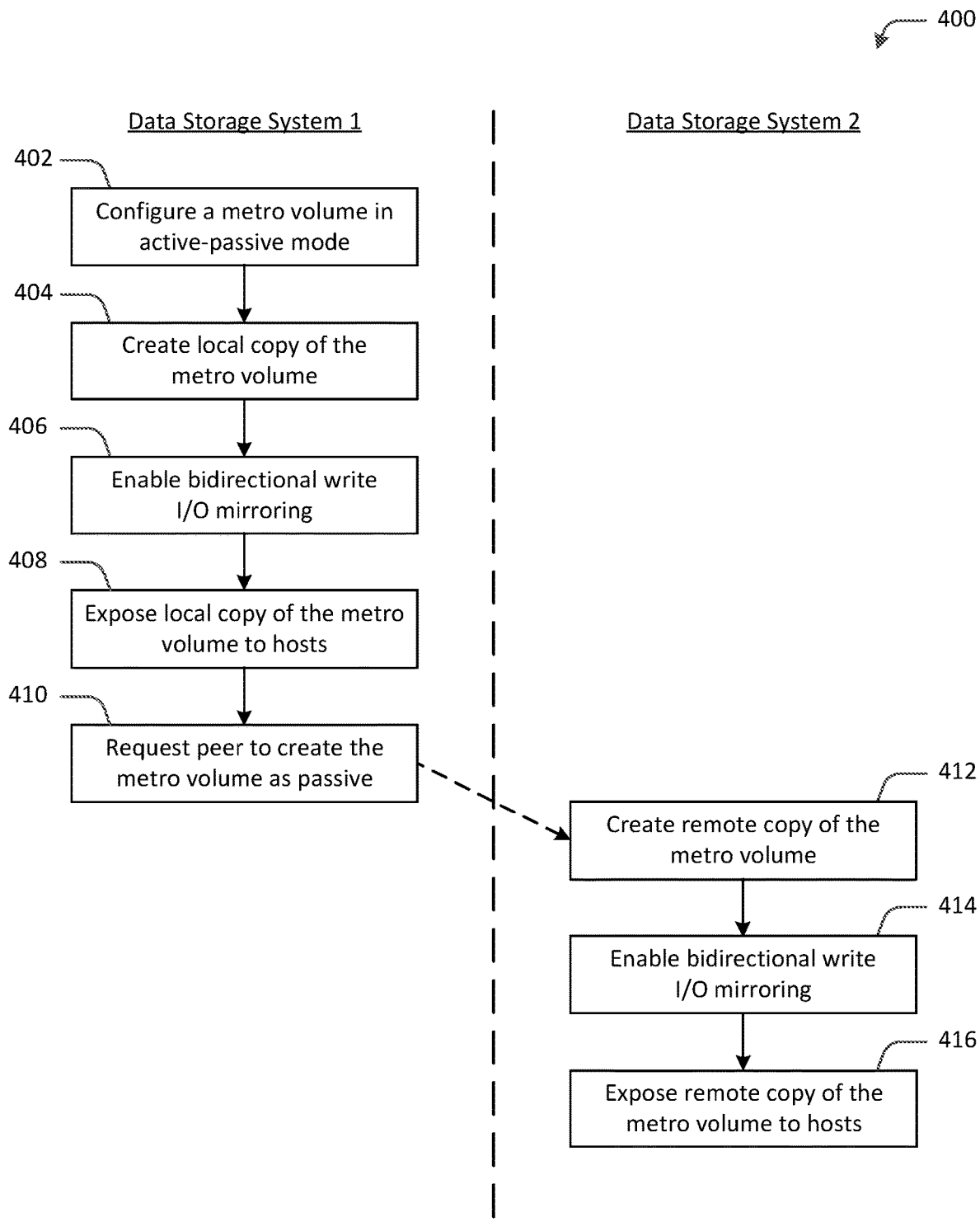
FIG. 4 is a flow diagram of an example process for configuring a metro volume in active-passive mode, in accordance with an embodiment of the present disclosure.

FIG. 4 is a flow diagram of an example process 400 for configuring a metro volume in active-passive mode, in accordance with an embodiment of the present disclosure. For example, as noted above, the metro volume may be associated with a storage environment (e.g., a metro cluster) that is in a state in which no volume is mapped to a host or a state in which an existing volume on a data storage system (e.g., data storage system 104-1) is mapped to a host (e.g., host 116-1) as a metro volume. With reference to process 400, at 402, a metro volume may be configured in active-passive mode in which the metro volume on data storage system 104-1 is active and the metro volume on its peer (e.g., data storage system 104-2) is passive. For example, a user, such as a system administrator, can utilize a UI provided by a storage system management application of data storage system 104-1 (e.g., storage system management application running on one of node 106-1 or node 108-1) to configure the metro volume in active-passive mode. In some embodiments of the active-passive metro cluster mode, the storage resource identity (SCSI or NVMe) may be the same on both sides, which allows applications to access the volume on both sides without any configuration changes.

At 404, data storage system 104-1 may create a local copy of the metro volume. In an example implementation, a control path component of data storage system 104-1 can communicate with a local data path component to create the local copy of the metro volume on storage 110-1 of data storage system 104-1. Here, the copy of the metro volume on storage 110-1 of data storage system 104-1 is being configured to be active. At 406, data storage system 104-1 may enable bidirectional write I/O mirroring. The bidirectional write I/O mirroring is in effect single direction synchronous remote replication from data storage system 104-1 to data storage system 104-2 since the metro volume on data storage system 104-1 is active.

At 408, data storage system 104-1 may expose the local copy of the metro volume to one or more hosts (e.g., host 116-1). In an example implementation, the control path component of data storage system 104-1 can communicate with a local I/O front end component to expose the local copy of the metro volume to hosts. In the active-passive mode, exposing the local copy of the metro volume may include configuring or otherwise switching the paths associated with data storage system 104-1 to enable write access (e.g., write access mode enabled). For example, the control path component of data storage system 104-1 can communicate with the local I/O front end component to switch the paths to enable write access. As a result, a SCSI Report Target Port Groups command when invoked, for example, by a host (e.g., host 116-1), may report an Active/Optimized ALUA state for target port group 112-1 of data storage system 104-1 and report an Active/Non-optimized ALUA state for target port group 114-1 of data storage system 104-1. If the host is attached over NVMe-oF, an ANA Group Optimized state for target port group 112-1 and an ANA Group Non-optimized state for target port group 114-1 may be reported. Once attached, a host can support (i.e., host) one or more applications. For example, as can be seen in FIG. 3, host 116-1 can host three applications, App 1, App 2, and App 3. While only three applications are illustrated in FIG. 3, it will be appreciated that host 116-1 may host any number of applications.

Referring again to FIG. 4, at 410, data storage system 104-1 may send or otherwise provide to its peer in the metro cluster (e.g., data storage system 104-2) a request to create the metro volume as passive. In an example implementation, the control path component of data storage system 104-1 can communicate with a control path component of data storage system 104-2 to request the creation of the metro volume.

Upon receiving the request to create the metro volume, at 412, data storage system 104-2 may create a remote copy of the metro volume. In an example implementation, the control path component of data storage system 104-2 can communicate with a local data path component to create the remote copy of the metro volume on storage 110-2 of data storage system 104-2. Here, the copy of the metro volume on storage 110-2 of data storage system 104-2 is being configured to be passive. At 414, data storage system 104-2 may enable bidirectional write I/O mirroring. The bidirectional write I/O mirroring is in effect single direction synchronous remote replication from data storage system 104-1 to data storage system 104-2 since the metro volume on data storage system 104-1 is active. That is, since the metro volume on data storage system 104-2 is passive, there is no write I/O mirroring is from data storage system 104-2 to data storage system 104-1.

At 416, data storage system 104-2 may expose the remote copy of the metro volume (i.e., the copy of the metro volume on storage 110-2) to one or more hosts. In an example implementation, the control path component of data storage system 104-2 can communicate with a local I/O front end component to expose the remote copy of the metro volume to hosts. In the active-passive mode, exposing the remote copy of the metro volume may include configuring or otherwise switching the paths associated with data storage system 104-2 to disable write access (e.g., write access mode disabled). For example, the control path component of data storage system 104-2 can communicate with the local I/O front end component to switch the paths to disable write access. As a result, a SCSI Report Target Port Groups command may report an Unavailable ALUA state for target port group 112-2 of data storage system 104-2 once the volume is mapped to a host. If the host is attached over NVMe-oF, an ANA Group Inaccessible state may be reported.

Note that, if active-active mode was specified during configuration (e.g., the system administrator specified to configure the metro volume in active-active mode), a SCSI Report Target Port Groups command may report Active/Optimized or Active/Non-optimized ALUA states for target port group 112-2 of data storage system 104-2 once the volume is mapped to a host. If the host is attached over NVMe-oF, an ANA Group Optimized or ANA Group Non-optimized states may be reported.

Figure 5:
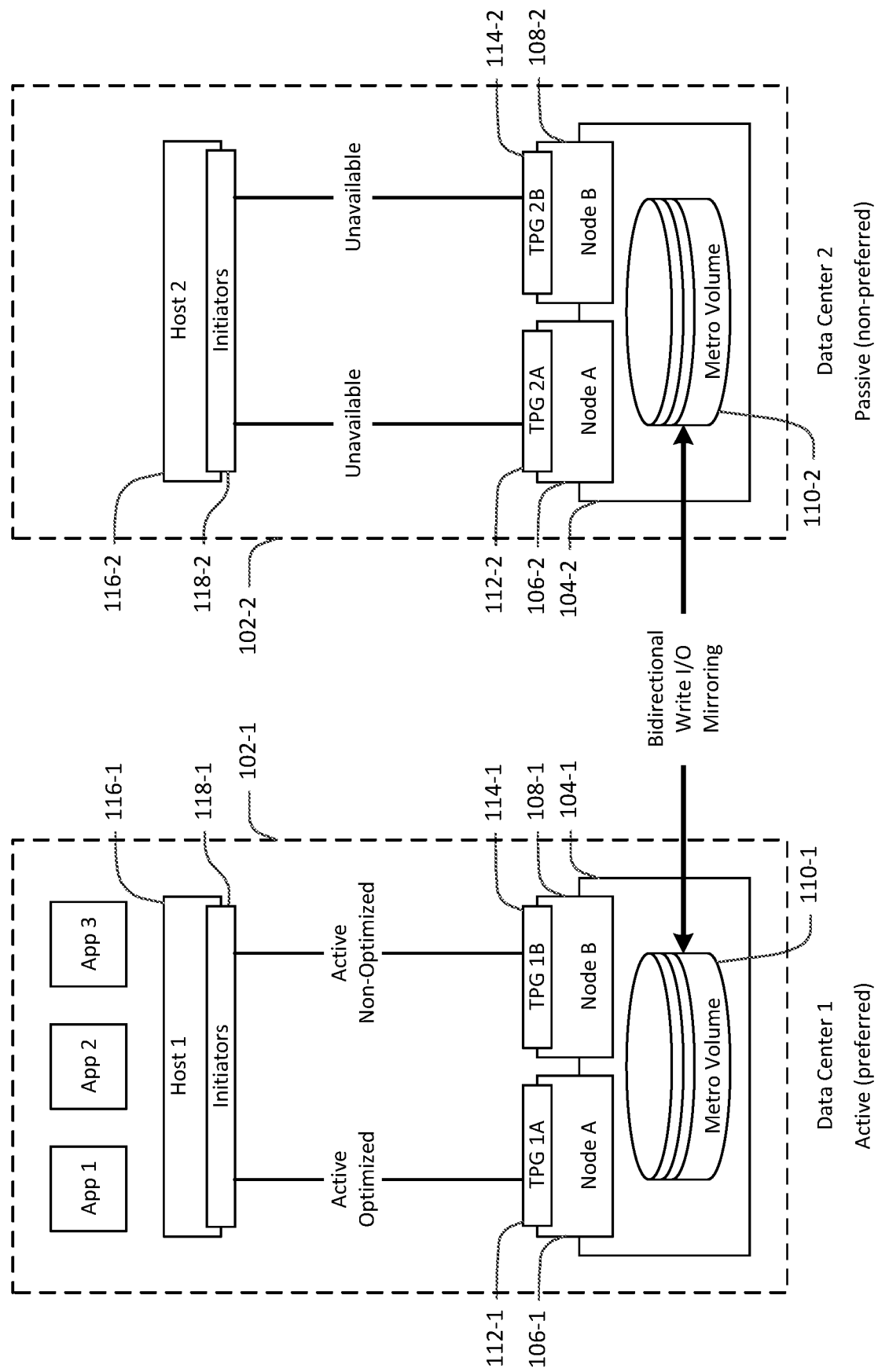
FIG. 5 illustrates the storage environment of FIG. 1 in which a passive side of a metro volume is mapped to a host, in accordance with an embodiment of the present disclosure.

Referring to FIG. 5, according to some embodiments, a passive side of a metro volume (e.g., the active-passive metro volume of FIG. 3) may be mapped to a host. For instance, the passive side may be mapped to a host to have one less operation to perform during failover. As shown in FIG. 5, when the active side of the metro volume (e.g., data storage system 104-1) is mapped to a host (e.g., host 116-1), the paths are in write access mode enabled. When in the enabled mode, the paths may be used for I/O requests directed to the LUN (i.e., metro volume). In SCSI implementations, the paths are ALUA Active/Optimized on one node (e.g., node 106-1) and ALUA Active/Non-optimized on the other node (e.g., node 108-1) of the active metro volume (e.g., data storage system 104-1). In NVMe-oF implementations, the paths on one node may be ANA Group Optimized and the paths on the other node may be ANA Group Non-optimized. In contrast, when the passive side of the metro volume (e.g., data storage system 104-2) is mapped to a host, the paths are in write access mode disabled (i.e., SCSI ALUA Unavailable or NVMe-oF ANA Group Inaccessible). When in the disabled mode, the platform front end (e.g., front ends of nodes 106-2, 108-2) can fail any I/O requests directed to the disabled write access mode volumes. Failing such I/O requests guarantees that a host cannot write to the passive side of the metro volume and corrupt the data. Since a host cannot write to the passive side of the metro volume, the passive side (e.g., data storage system 104-2) may be mapped to a host (e.g., host 116-2). Mapping a passive side of a metro volume to a host may be useful for reducing RTO during failover, for example.

Figure 6:
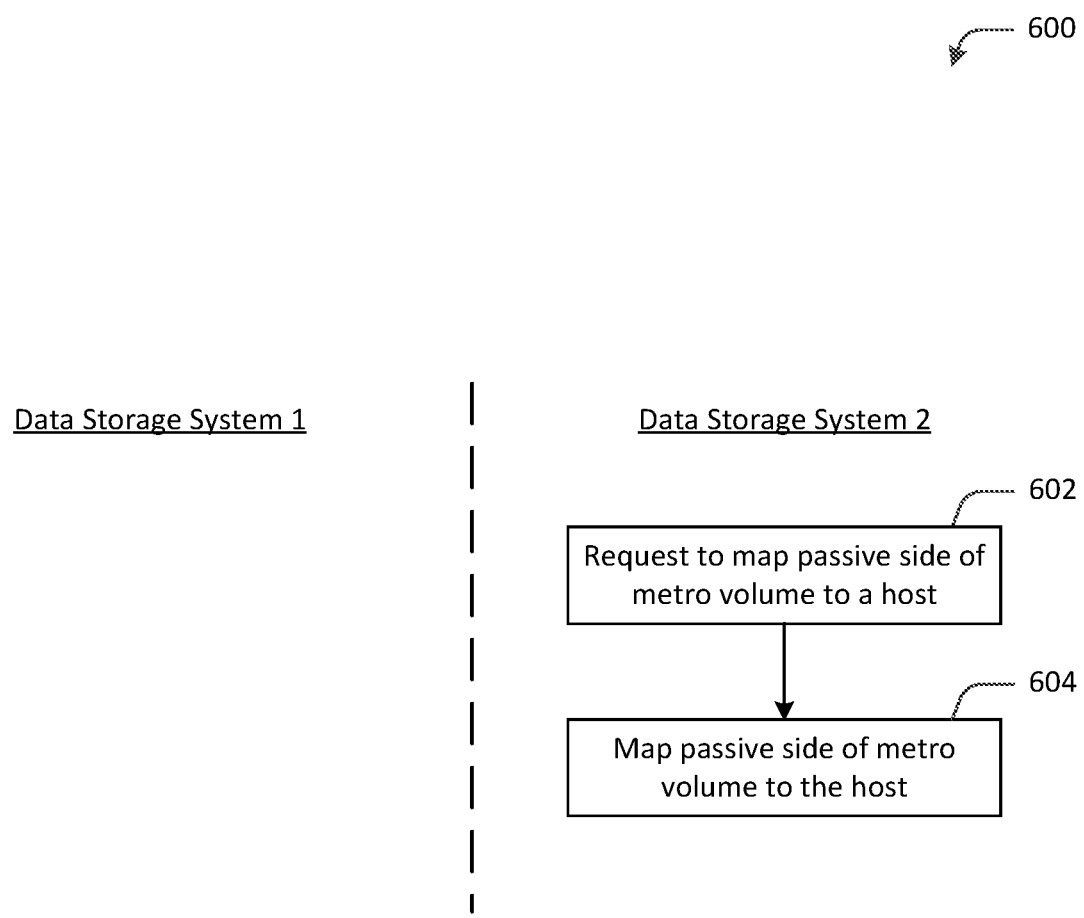
FIG. 6 is a flow diagram of an example process for mapping a passive side of a metro volume to a host, in accordance with an embodiment of the present disclosure.

FIG. 6 is a flow diagram of an example process 600 for mapping a passive side of a metro volume to a host, in accordance with an embodiment of the present disclosure. At 602, a request may be received to map a passive side (e.g., data storage system 104-2) of a metro volume to a host. For example, a user, such as a system administrator, can utilize a UI provided by a storage system management application of data storage system 104-2 (e.g., storage system management application running on one of node 106-2 or node 108-2) to map data storage system 104-2 to host 116-2. Upon receiving the request, at 604, data storage system 104-2 may map the metro volume on storage 110-2 to host 116-2. In an example implementation, a control path component of data storage system 104-2 can communicate with a local I/O front end component to map the metro volume on storage 110-2 to host 116-2. As a result, a SCSI Report Target Port Groups command when invoked, for example, by host 116-2, may report Unavailable ALUA states for target port groups 112-2, 114-2 of data storage system 104-2. If host 116-2 is attached over NVMe-oF, an ANA Group Inaccessible state may be reported for target port groups 112-2, 114-2 of data storage system 104-2.

Figure 7A:
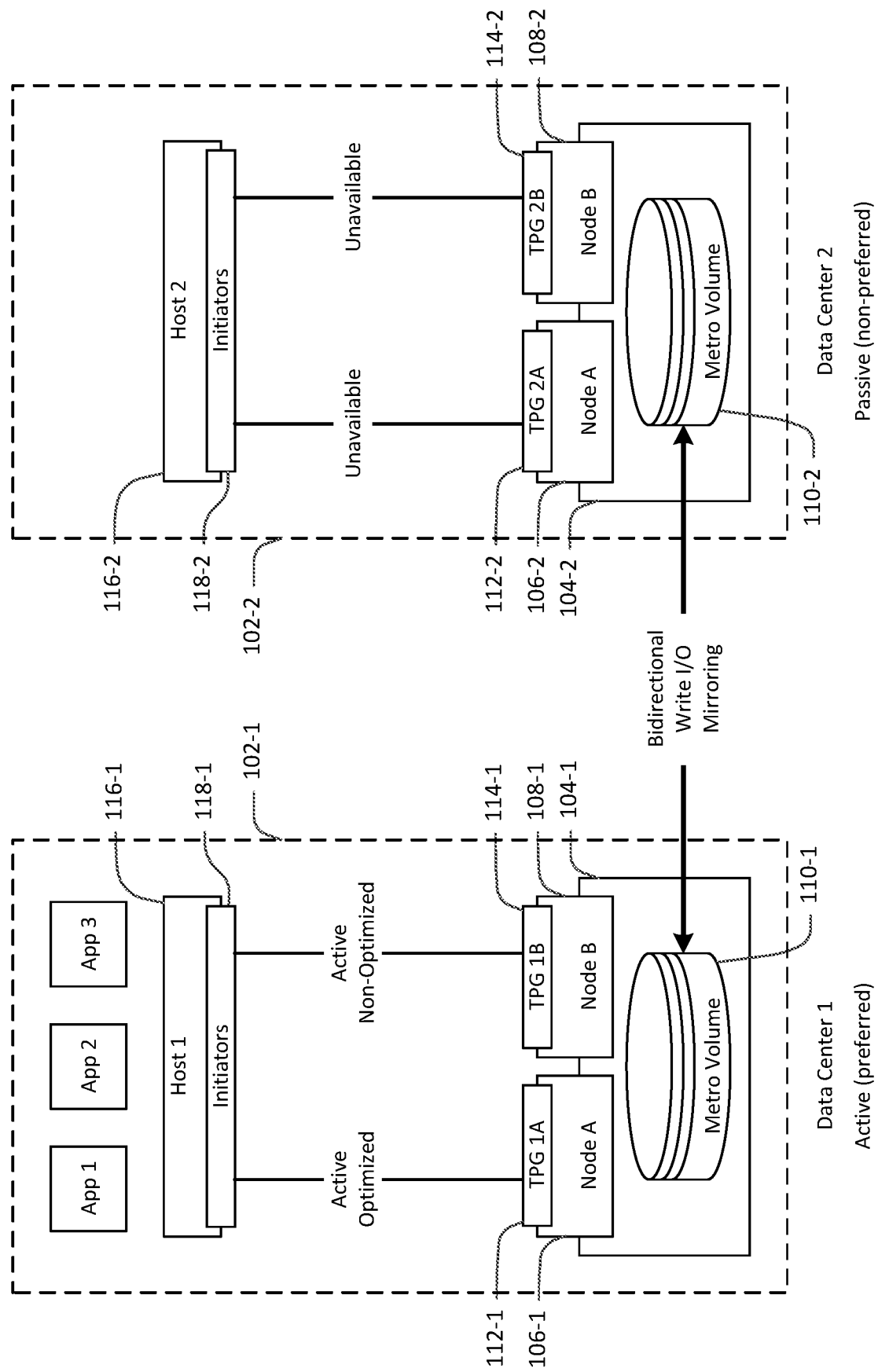
FIGS. 7A and 7B collectively illustrate reconfiguration of an active-passive metro volume into an active-active metro volume, in accordance with an embodiment of the present disclosure.
Figure 7B:
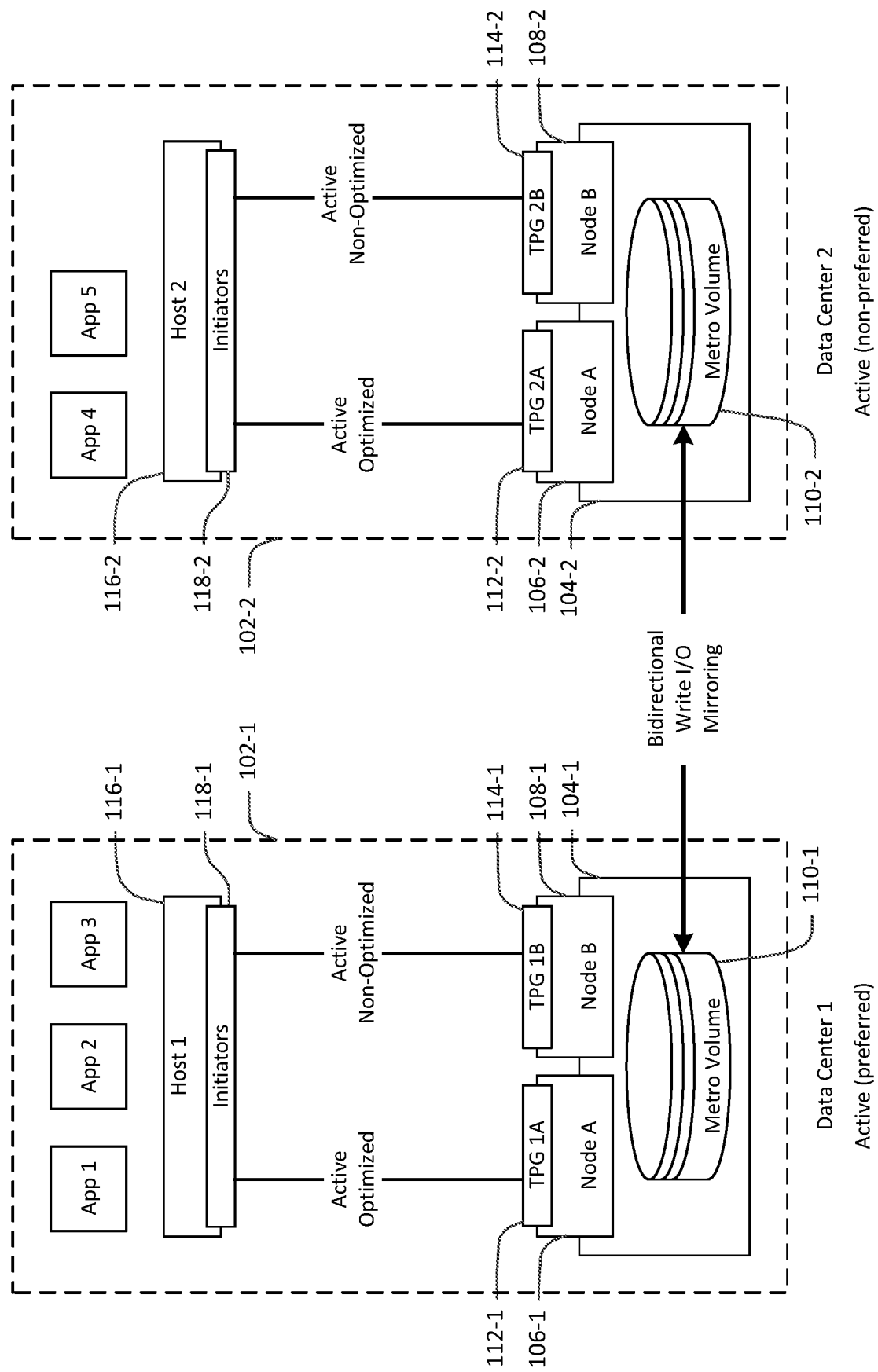

Referring to FIGS. 7A and 7B, according to some embodiments, an active-passive metro volume may be reconfigured into an active-active metro volume. As shown in FIG. 7A, a metro volume may be configured in active-passive mode in which the metro volume on data storage system 104-1 is active and the metro volume on its peer, data storage system 104-2, is passive. As shown in FIG. 7B, the active-passive metro volume may be reconfigured into an active-active metro volume in which the metro volume on data storage system 104-1 and the metro volume on data storage system 104-2 are both active. For example, as can be seen in FIG. 7B, the metro volume on data storage system 104-1 may be active preferred and the metro volume on data storage system 104-2 may be active non-preferred. Active preferred and active non-preferred differ with respect to failure handling. While both storage systems are operating normally without failures of any kind and network connecting the two storage systems is also operational, the two storage systems replicate host write I/O to each other and may also perform periodic heartbeat messaging. If the network or one of storage systems fails, the failure manifests itself to the surviving storage system as absence of replicated write I/O and absence of heartbeat. Storage systems may not be able to distinguish between a network failure and other system failure on their own. Thus, to avoid "split brain" (i.e., both storage systems keeping their respective sides of a metro volume online while not being able to replicate writes to each other), if communication is lost, the preferred storage system keeps the volume online and the non-preferred storage system brings the volume off-line.

Figure 8:
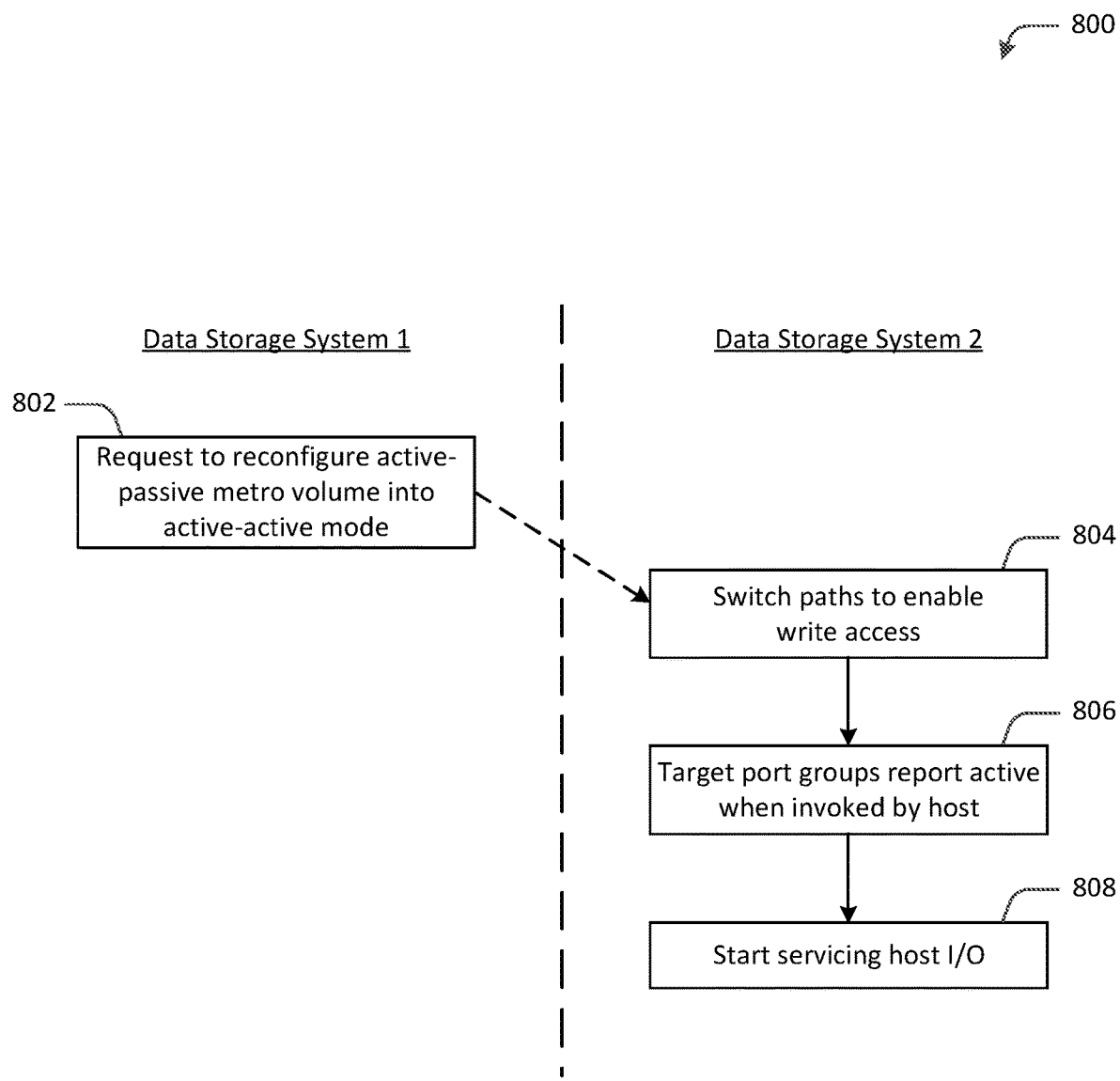
FIG. 8 is a flow diagram of an example process for reconfiguring an active-passive metro volume into an active-active metro volume, in accordance with an embodiment of the present disclosure.

FIG. 8 is a flow diagram of an example process 800 for reconfiguring an active-passive metro volume into an active-active metro volume, in accordance with an embodiment of the present disclosure. At 802, a request may be received to reconfigure an active-passive metro volume into an active-active metro volume. For example, a user, such as a system administrator, can utilize a UI provided by a storage system management application of data storage system 104-1 (e.g., storage system management application running on one of node 106-1 or node 108-1) to reconfigure the active-passive metro volume into an active-active metro volume. In response to the request, data storage system 104-1 may send or otherwise provide to data storage system 104-2 a request to reconfigure the metro volume on data storage system 104-2 from its current passive mode to an active mode. In an example implementation, a control path component of data storage system 104-1 can communicate with a control path component of data storage system 104-2 to request the reconfiguration of the metro volume.

Upon receiving the request to reconfigure the metro volume, at 804, data storage system 104-2 may switch the paths to enable write access (e.g., write access mode enabled). In an example implementation, the control path component of data storage system 104-2 can communicate with the local I/O front end component to switch the paths to enable write access. For example, as shown in FIG. 7B, the path(s) on node 106-2 may be switched to ALUA Active/Optimized and the path(s) on node 108-2 may be switched to ALUA Active/Non-optimized. Note that bidirectional write I/O mirroring is already enabled on data storage system 104-2. As described previously, when the metro volume on data storage system 104-2 was in the previous passive mode, no write I/O mirroring was being performed from data storage system 104-2 to data storage system 104-1.

Referring again to FIG. 8, at 806, a SCSI Report Target Port Groups command, when invoked by host 116-2, may report an Active/Optimized ALUA state for target port group 112-2 of data storage system 104-2 and report an Active/Non-optimized ALUA state for target port group 114-2 of data storage system 104-2. If host 116-2 is attached over NVMe-oF, an ANA Group Optimized state for target port group 112-2 and an ANA Group Non-optimized state for target port group 114-2 may be reported.

At 808, the active metro volume on data storage system 104-2 may start servicing host I/O requests from applications being hosted by host 116-2. For example, as can be seen in FIG. 7B, host 116-2 can host two applications, App 4 and App 5. While only two applications are illustrated in FIG. 7B, it will be appreciated that host 116-2 may host any number of applications.

Figure 9A:
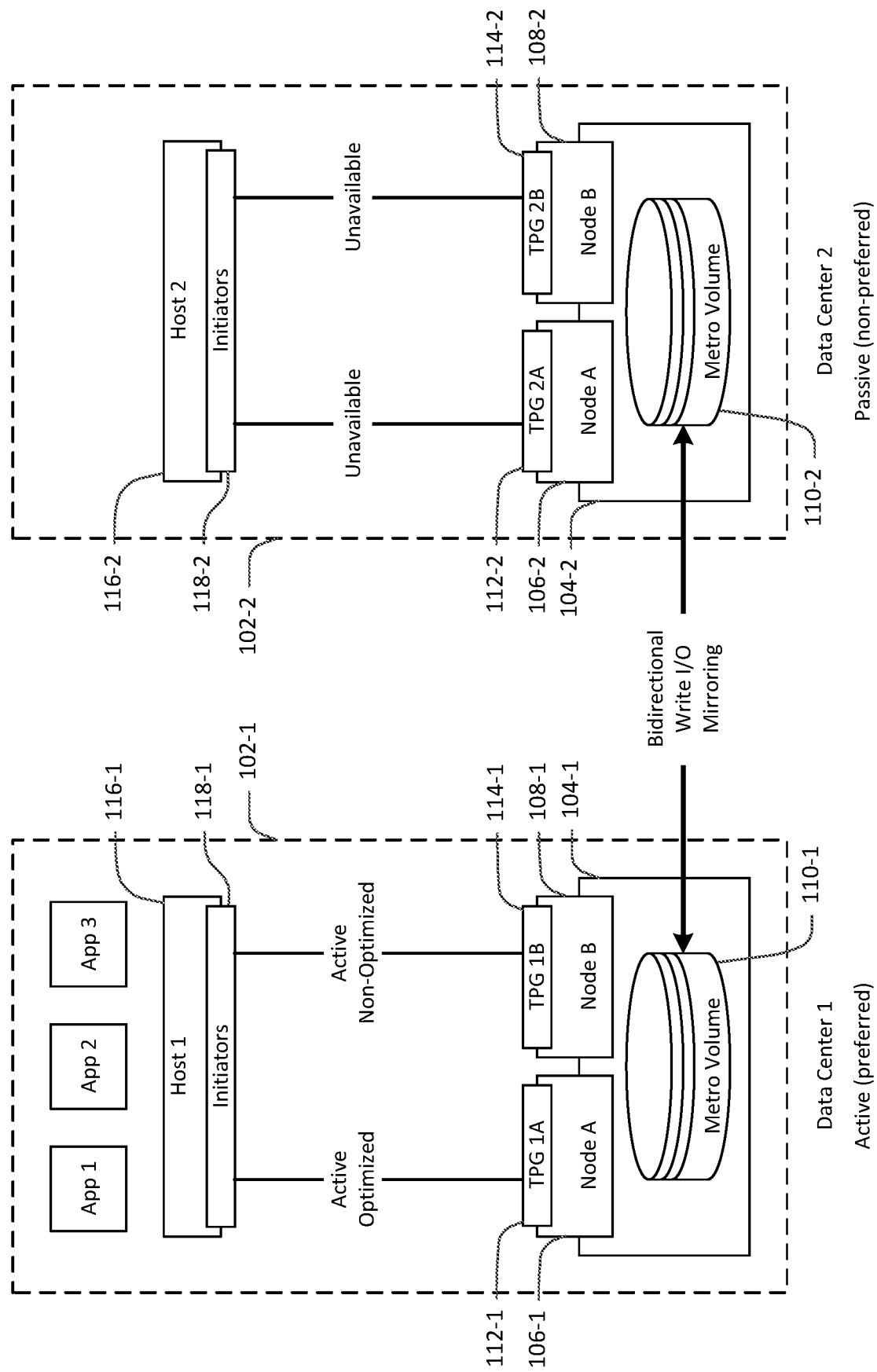
FIGS. 9A and 9B collectively illustrate planned failover for an active-passive metro volume group with preferred side switch, in accordance with an embodiment of the present disclosure.
Figure 9B:
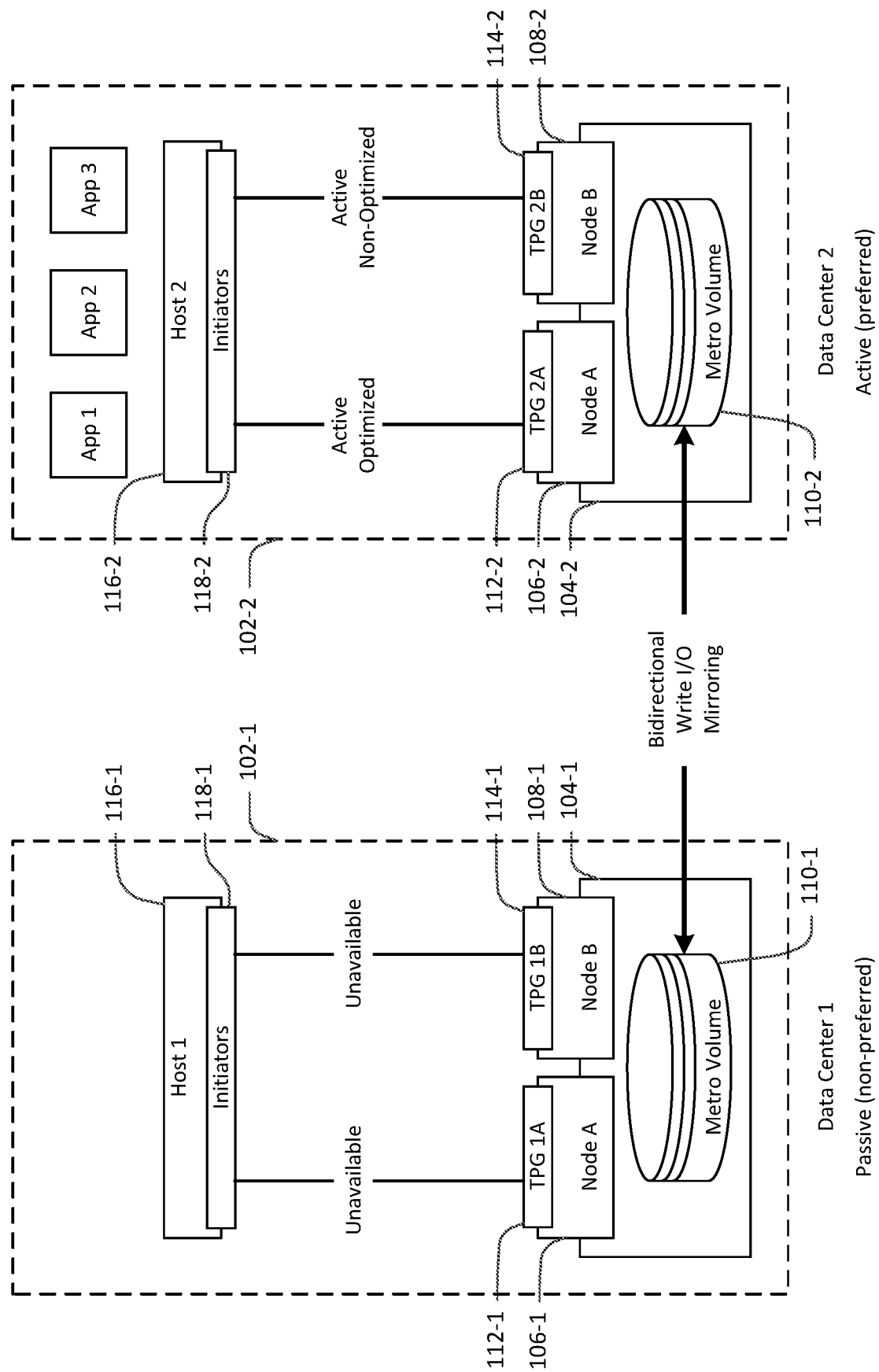

Referring to FIGS. 9A and 9B, according to some embodiments, a planned failover for an active-passive metro volume group with preferred side switch is illustrated. As shown in FIG. 9A, a metro volume may be configured in active-passive mode in which the metro volume on data storage system 104-1 is active and the metro volume on its peer, data storage system 104-2, is passive. The planned failover changes the preferred side of the metro volume from data storage system 104-1 to data storage system 104-2. In performing the planned failover, write access to the new passive side, data storage system 104-1, is disabled, and write access to the new active side, data storage system 104-2, is enabled. FIG. 9B illustrates the metro volume after the planned failover of the active-passive volume group with preferred side switch. Note that, since hosts on the production side (e.g., data storage system 104-1) and the disaster recovery side (e.g., data storage system 104-2) are connected to their respective data storage systems, applications that are hosted on host 116-1 (e.g., App 1, App 2, and App 3 as shown in FIG. 9A) need to be powered down before switching the preferred side and powered up after the switch on host 116-2 (e.g., App 1, App 2, and App 3 as shown in FIG. 9B).

Figure 10:
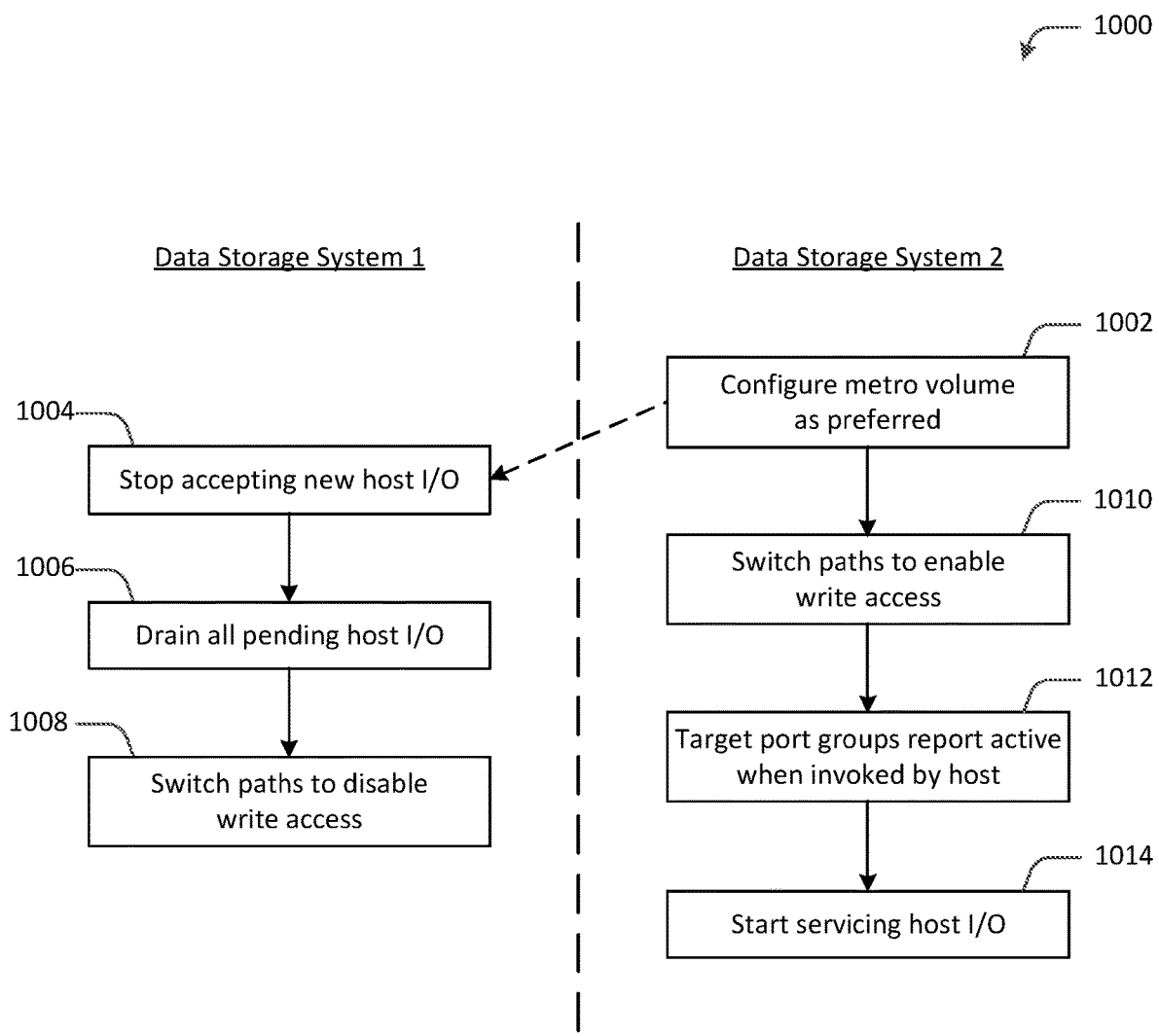
FIG. 10 is a flow diagram of an example process for performing a planned failover for an active-passive metro volume group with preferred side switch, in accordance with an embodiment of the present disclosure.

FIG. 10 is a flow diagram of an example process 1000 for performing a planned failover for an active-passive metro volume group with preferred side switch, in accordance with an embodiment of the present disclosure. At 1002, a request may be received to configure the metro volume on data storage system 104-2 as preferred. For example, a user, such as a system administrator, can utilize a UI provided by a storage system management application of data storage system 104-2 (e.g., storage system management application running on one of node 106-2 or node 108-2) to configure the currently passive metro volume on data storage system 104-2 as preferred. In response to the request, data storage system 104-2 may send or otherwise provide to data storage system 104-1 a request to perform the planned failover of data storage system 104-1 to data storage system 104-2 with preferred side switch. In an example implementation, a control path component of data storage system 104-2 can communicate with a control path component of data storage system 104-1 to request the planned failover.

Upon receiving the request for the planned failover, at 1004, data storage system 104-1 may stop accepting new host I/O requests. In an example implementation, the control path component of data storage system 104-1 can communicate with a local I/O front end component to stop accepting new host I/O requests. At 1006, data storage system 104-1 may drain all pending host I/O requests. In an example implementation, the control path component of data storage system 104-1 can communicate with the local I/O front end component to drain all pending host I/O requests. For example, the pending host I/O requests may be processed by data storage system 104-1.

At 1008, data storage system 104-1 may switch the paths to disable write access (e.g., write access mode disabled). In an example implementation, the control path component of data storage system 104-1 can communicate with the local I/O front end component to switch the paths to disable write access. As a result, as can be seen in FIG. 9B, a SCSI Report Target Port Groups command when invoked, for example, by host 116-1, may report Unavailable ALUA states for target port groups 112-1, 114-1 of data storage system 104-1. If host 116-1 is attached over NVMe-oF, an ANA Group Inaccessible state may be reported for target port groups 112-1, 114-1 of data storage system 104-1.

Referring again to FIG. 10, at 1010, data storage system 104-2 may switch the paths to enable write access (e.g., write access mode enabled). In an example implementation, the control path component of data storage system 104-2 can communicate with a local I/O front end component to switch the paths to enable write access. For example, as shown in FIG. 9B, the path(s) on node 106-2 may be switched to ALUA Active/Optimized and the path(s) on node 108-2 may be switched to ALUA Active/Non-optimized. Note that bidirectional write I/O mirroring is already enabled on data storage system 104-2. As described previously, when the metro volume on data storage system 104-2 was in the previous passive mode, no write I/O mirroring was being performed from data storage system 104-2 to data storage system 104-1.

Referring again to FIG. 10, at 1012, a SCSI Report Target Port Groups command, when invoked by host 116-2, may report an Active/Optimized ALUA state for target port group 112-2 of data storage system 104-2 and report an Active/Non-optimized ALUA state for target port group 114-2 of data storage system 104-2. If host 116-2 is attached over NVMe-oF, an ANA Group Optimized state for target port group 112-2 and an ANA Group Non-optimized state for target port group 114-2 may be reported.

At 1014, the active metro volume on data storage system 104-2 may start servicing host I/O requests from applications being hosted by host 116-2. For example, as can be seen in FIG. 9B, the applications (e.g., App 1, App 2, and App 3) that were being hosted on data storage system 104-1 may be restarted on data storage system 104-2 (i.e., powered up on host 116-2).

Figure 11:
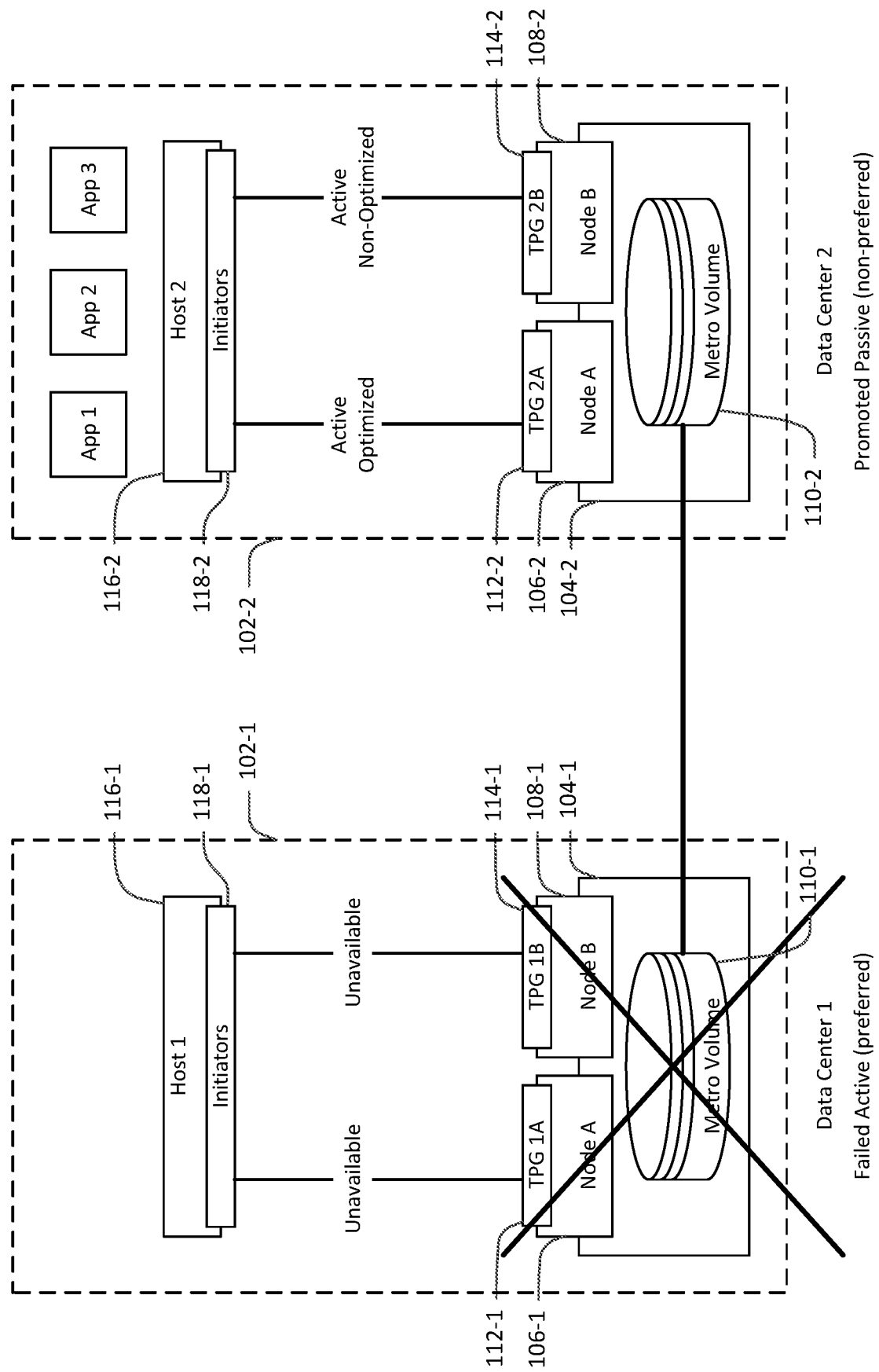
FIG. 11 illustrates an unplanned failover for an active-passive metro volume with non-preferred side promote, in accordance with an embodiment of the present disclosure.

Referring to FIG. 11, according to some embodiments, an unplanned failover for an active-passive metro volume with non-preferred side promote is illustrated. As shown in FIG. 11, a metro volume may be configured in active-passive mode in which the metro volume on data storage system 104-1 is active and the metro volume on its peer, data storage system 104-2, is passive. The unplanned failover with non-preferred side promote promotes the previously passive side of the metro volume (e.g., data storage system 104-2) upon a failure of the active side of the metro volume (e.g., data storage system 104-1). For example, the unplanned failover may be performed in the case of an unexpected data storage system 104-1 malfunction. Note that, in performing the unplanned failover, all applications running on host 116-1 likely need to be stopped (i.e., the system checks to ensure that no application is running on host 116-1) since the unplanned failover does not make the metro volume on data storage system 104-1 read-only. Also note that the applications which were running on data storage system 104-1 may be powered up to run on host 116-2 after data storage system 104-2 is promoted.

Figure 12:
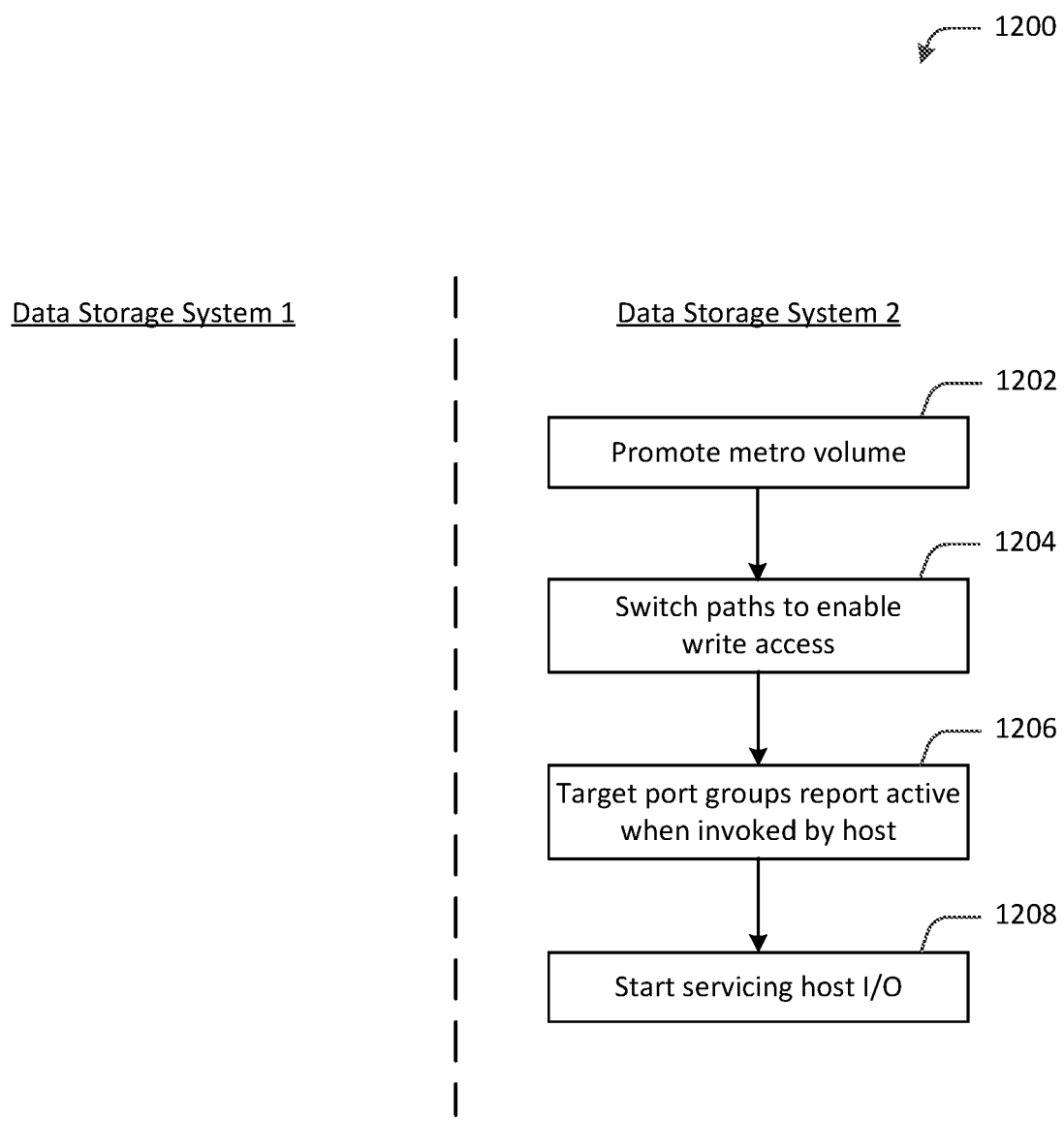
FIG. 12 is a flow diagram of an example process for performing an unplanned failover for an active-passive metro volume with non-preferred side promote, in accordance with an embodiment of the present disclosure.

FIG. 12 is a flow diagram of an example process 1200 for performing an unplanned failover for an active-passive metro volume with non-preferred side promote, in accordance with an embodiment of the present disclosure. At 1202, a request may be received to promote the metro volume on data storage system 104-2. For example, a user, such as a system administrator, can utilize a UI provided by a storage system management application of data storage system 104-2 (e.g., storage system management application running on one of node 106-2 or node 108-2) to promote the currently passive metro volume on data storage system 104-2.

Upon receiving the request, at 1204, data storage system 104-2 may switch the paths to enable write access (e.g., write access mode enabled). In an example implementation, a control path component of data storage system 104-2 can communicate with a local I/O front end component to switch the paths to enable write access. For example, as shown in FIG. 11, the path(s) on node 106-2 may be switched to ALUA Active/Optimized and the path(s) on node 108-2 may be switched to ALUA Active/Non-optimized. Note that no write I/O mirroring is configured between data storage system 104-2 and data storage system 104-1 since data storage system 104-1 is in a failed state.

Referring again to FIG. 12, at 1206, a SCSI Report Target Port Groups command, when invoked by host 116-2, may report an Active/Optimized ALUA state for target port group 112-2 of data storage system 104-2 and report an Active/Non-optimized ALUA state for target port group 114-2 of data storage system 104-2. If host 116-2 is attached over NVMe-oF, an ANA Group Optimized state for target port group 112-2 and an ANA Group Non-optimized state for target port group 114-2 may be reported.

At 1208, the promoted metro volume on data storage system 104-2 may start servicing host I/O requests from applications being hosted by host 116-2. For example, as can be seen in FIG. 11, the applications (e.g., App 1, App 2, and App 3) that were being hosted on data storage system 104-1 may be restarted on data storage system 104-2 (i.e., powered up on host 116-2).

Figure 13:
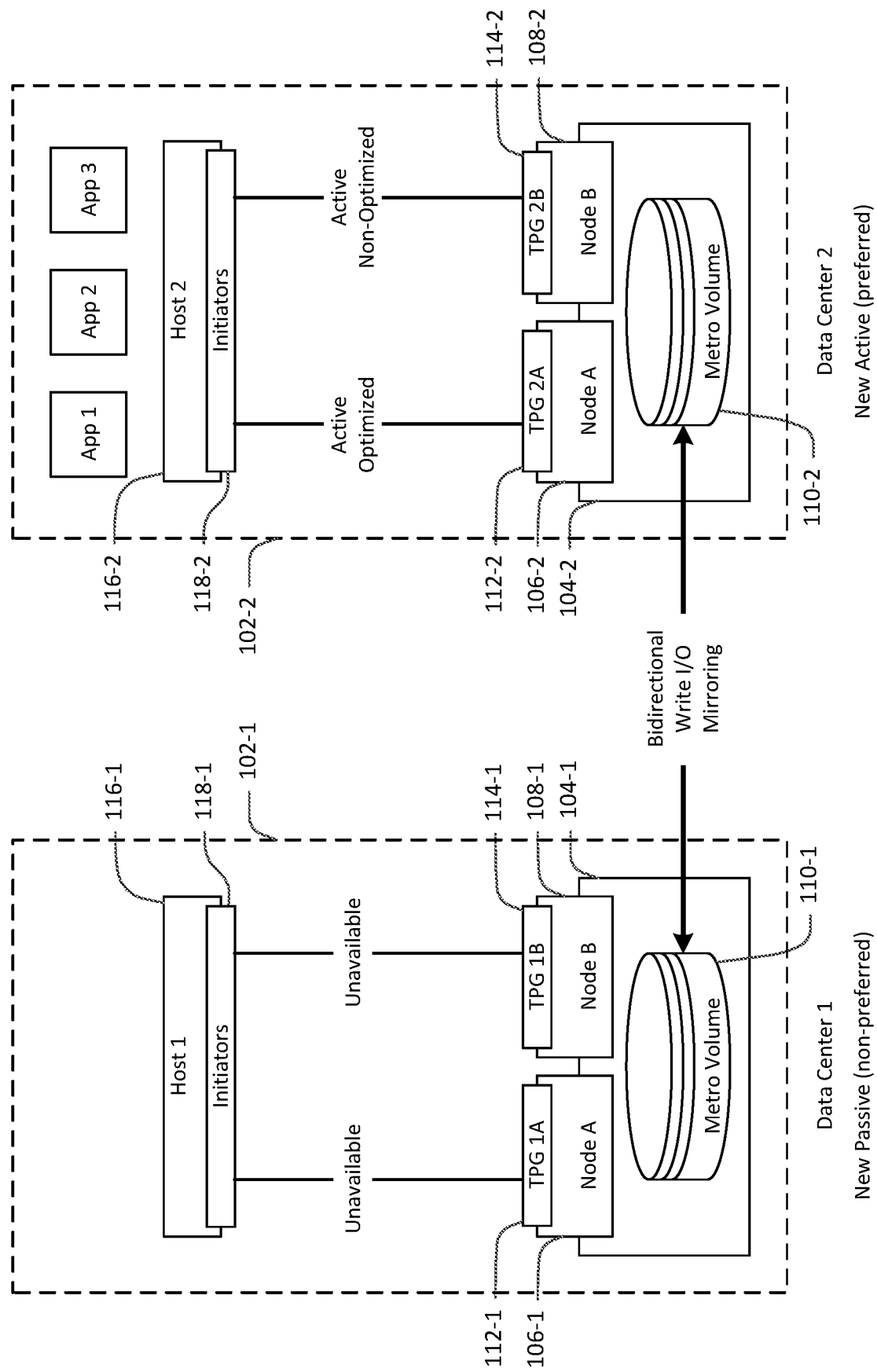
FIG. 13 illustrates a re-protect of an active-passive volume after a failure, in accordance with an embodiment of the present disclosure.

Referring to FIG. 13, according to some embodiments, a re-protect of an active-passive volume after a failure is illustrated. As shown in FIG. 13, a re-protect can be performed after a failed preferred side of a metro volume (e.g., data storage system 104-1) has recovered. The re-protect of the metro volume from data storage system 104-2 to data storage system 104-1 brings data storage system 104-1 in synchronization with data storage system 104-2. In embodiments, the re-protect process includes configuring the previous passive, non-preferred side of the metro volume to be the new active, preferred side of the metro volume, and re-protecting the new passive side of the metro volume from the new active side of the metro volume.

Figure 14:
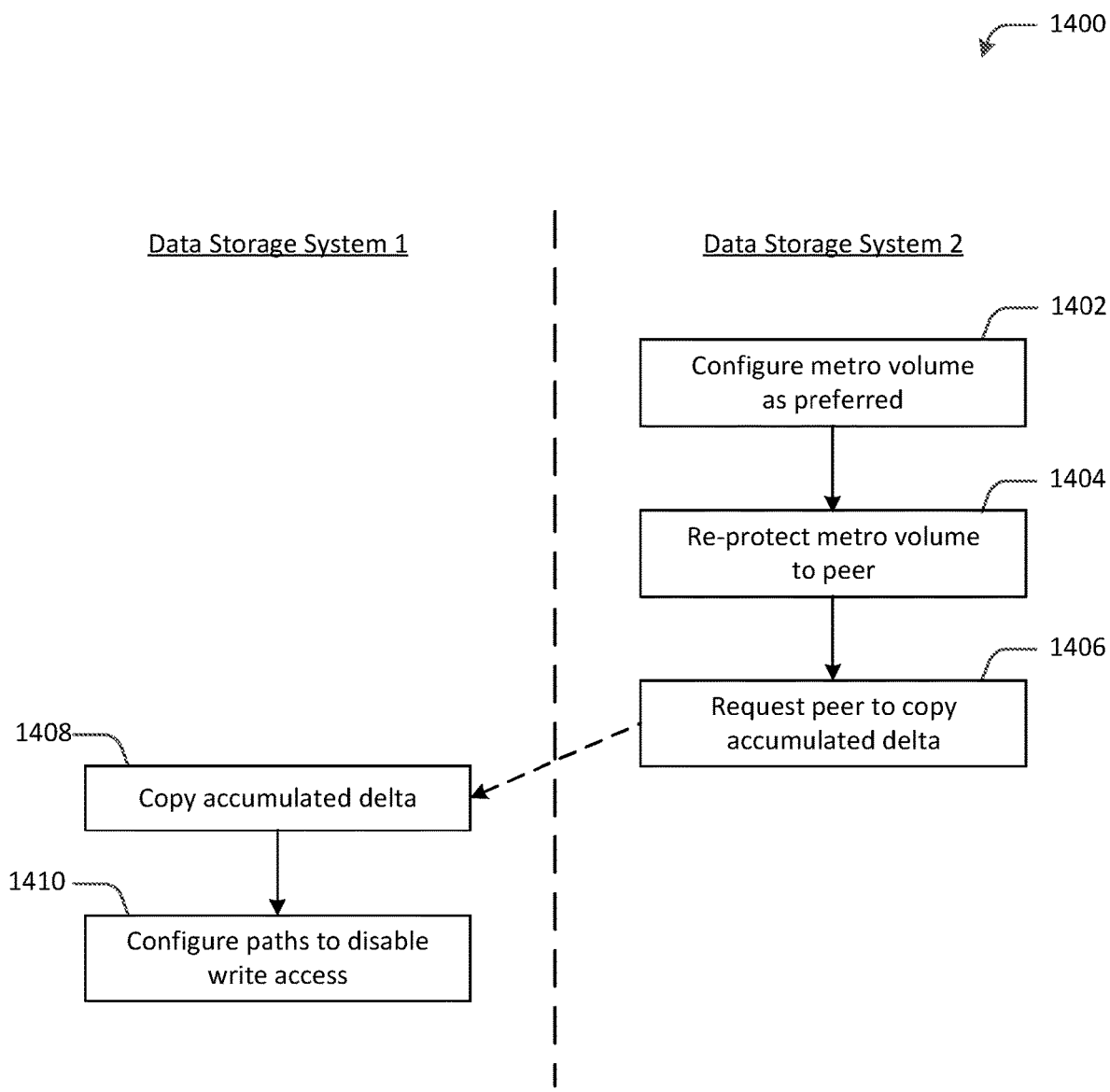
FIG. 14 is a flow diagram of an example process for re-protecting an active-passive volume after a failure, in accordance with an embodiment of the present disclosure.

FIG. 14 is a flow diagram of an example process 1400 for re-protecting an active-passive volume after a failure, in accordance with an embodiment of the present disclosure. For example, process 1400 may be performed after an unplanned failover is performed (e.g., See FIG. 11), when the data storage system 104-1 comes back online. After process 1400 is performed, data storage system 104-1 may be made active and data storage system, 104-2 may be made passive (or write-protected). As another example, process 1400 may be executed after a planned failover is performed (e.g., see FIG. 10). At 1402, a request may be received to configure the metro volume on data storage system 104-2 as preferred. For example, a user, such as a system administrator, can utilize a UI provided by a storage system management application of data storage system 104-2 (e.g., storage system management application running on one of node 106-2 or node 108-2) to configure the promoted passive metro volume on data storage system 104-2 as preferred. In an example implementation, a control path component of data storage system 104-2 can persist the change in mode in a management database, for example.

At 1404, a request may be received to re-protect the metro volume on data storage system 104-2 For example, the system administrator can utilize the UI provided by the storage system management application of data storage system 104-2 (e.g., storage system management application running on one of node 106-2 or node 108-2) to request re-protect of the metro volume to data storage system 104-1. Upon receiving the request, at 1406, data storage system 104-2 may send or otherwise provide to data storage system 104-1 a request to copy the accumulated delta. In an example implementation, a replication session component of data storage system 104-2 can communicate to data storage system 104-1 the accumulated delta.

Upon receiving the request to copy the accumulated delta, at 1408, data storage system 104-1 may copy the accumulated delta to storage 110-1, and synchronize the states of storage 110-1 and storage 110-2 as a result. Upon copying the accumulated delta, at 1410, data storage system 104-1 may configure the paths to disable write access (e.g., write access mode disabled). In an example implementation, a control path component of data storage system 104-1 can communicate with the local I/O front end component to switch the paths to disable write access. As a result, as can be seen in FIG. 13, a SCSI Report Target Port Groups command when invoked, for example, by host 116-1, may report Unavailable ALUA states for target port groups 112-1, 114-1 of data storage system 104-1. If host 116-1 is attached over NVMe-oF, an ANA Group Inaccessible state may be reported for target port groups 112-1, 114-1 of data storage system 104-1.

Figure 15:
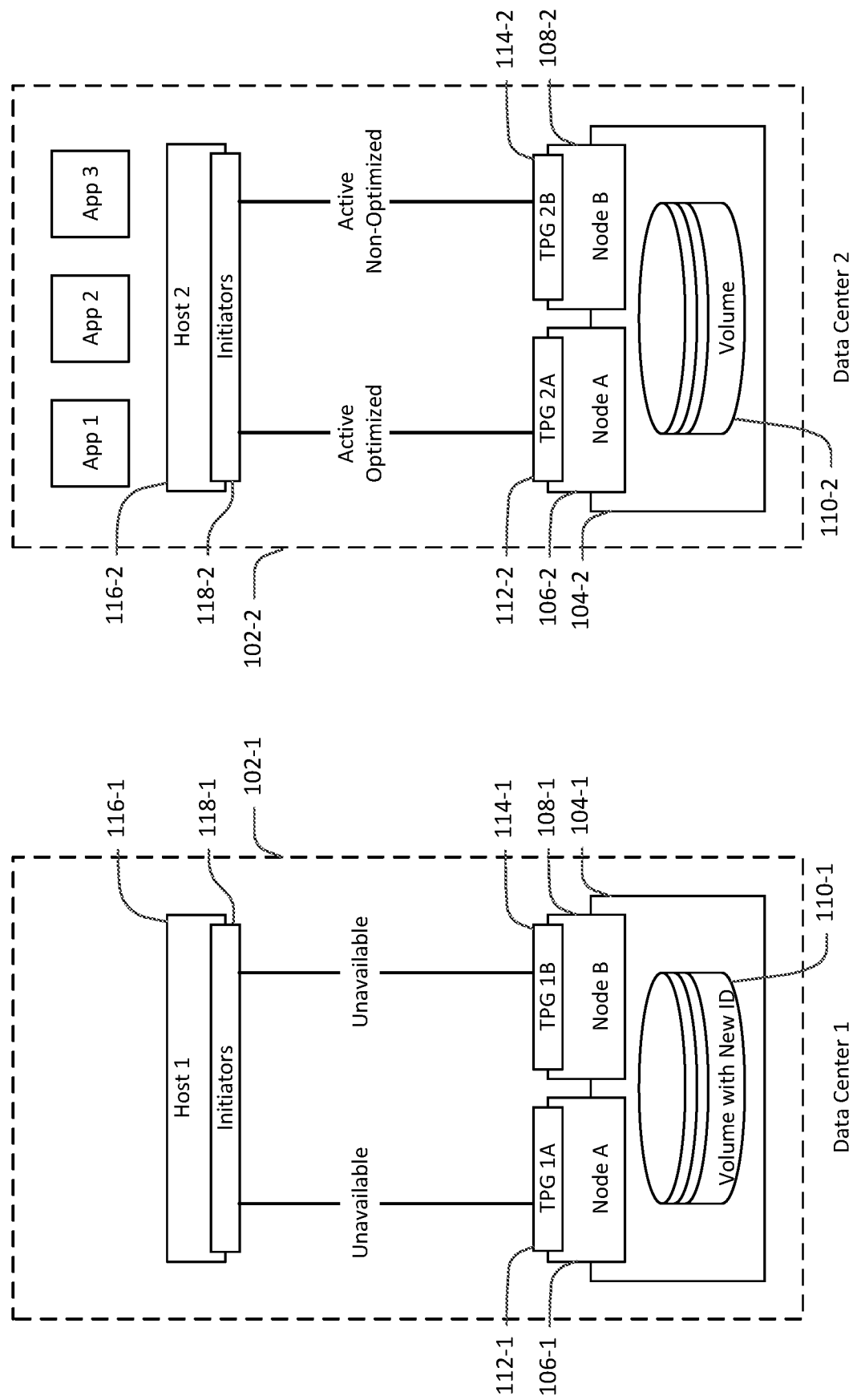
FIG. 15 illustrates an end of an active-passive metro volume, in accordance with an embodiment of the present disclosure.

Referring to FIG. 15, according to some embodiments, an end of an active-passive metro volume is illustrated. As shown in FIG. 15, once synchronous remote replication is no longer needed, the metro volume can be ended. Unlike the active-active configuration in which the metro volume can be ended from either side (i.e., from the active side or the passive side), an active-passive metro volume can only be ended from the active (preferred) side to avoid unwanted failover to the passive side. In embodiments, the volume on the passive side may be maintained with a different identity (e.g., a different LUN).

Figure 16:
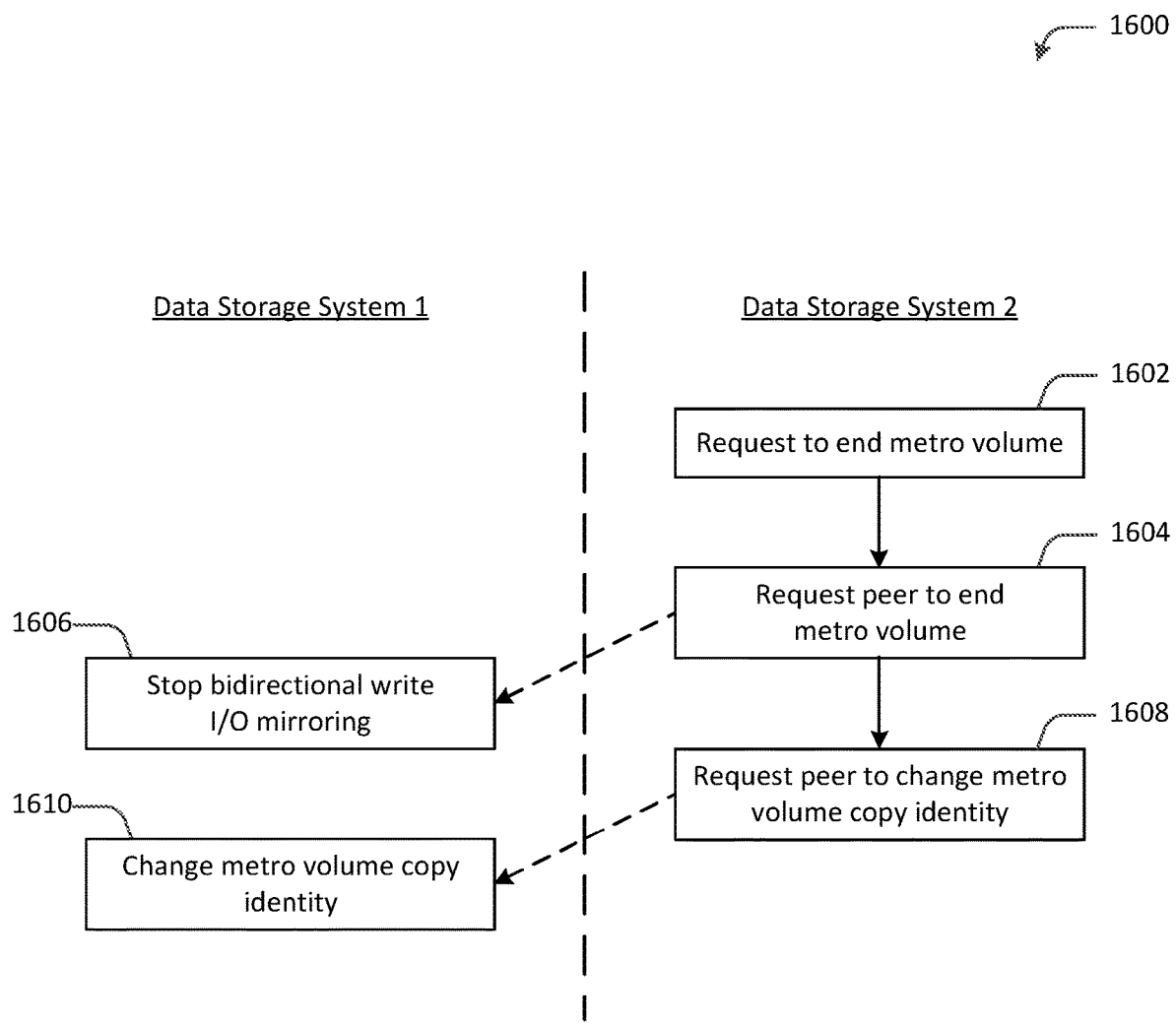
FIG. 16 is a flow diagram of an example process for ending of an active-passive metro volume, in accordance with an embodiment of the present disclosure.

FIG. 16 is a flow diagram of an example process 1600 for ending of an active-passive metro volume, in accordance with an embodiment of the present disclosure. For example, and without limitation, process 1600 may be performed after a planned failover is performed (e.g., See FIG. 10), when it is not desired to re-protect data storage system 140-2 (e.g., by executing process 1400). At 1602, a request may be received to end the metro volume on data storage system 104-2. For example, a user, such as a system administrator, can utilize a UI provided by a storage system management application of data storage system 104-2 (e.g., storage system management application running on one of node 106-2 or node 108-2) to request the end of the metro volume. Upon receiving the request, at 1604, data storage system 104-2 may send or otherwise provide to data storage system 104-1 a request to end the metro volume. In an example implementation, a control path component of data storage system 104-2 can communicate with a control path component of data storage system 104-1 to end the metro volume.

Upon receiving the request to end the metro volume, at 1606, data storage system 104-1 may stop the bidirectional write I/O mirroring. In an example implementation, the control path component of data storage system 104-1 can communicate with a local data path component to disable or otherwise stop the bidirectional write I/O mirroring.

At 1608, data storage system 104-2 may send or otherwise provide to data storage system 104-1 a request to change the metro volume copy identity (e.g., the SCSI identity). In an example implementation, the control path component of data storage system 104-2 can communicate with the control path component of data storage system 104-1 to change the metro volume copy identity. Upon receiving the request to change the metro volume copy identity, at 1610, data storage system 104-1 may change the identity of the metro volume on storage 110-1 of data storage system 104-1.

Figure 17:
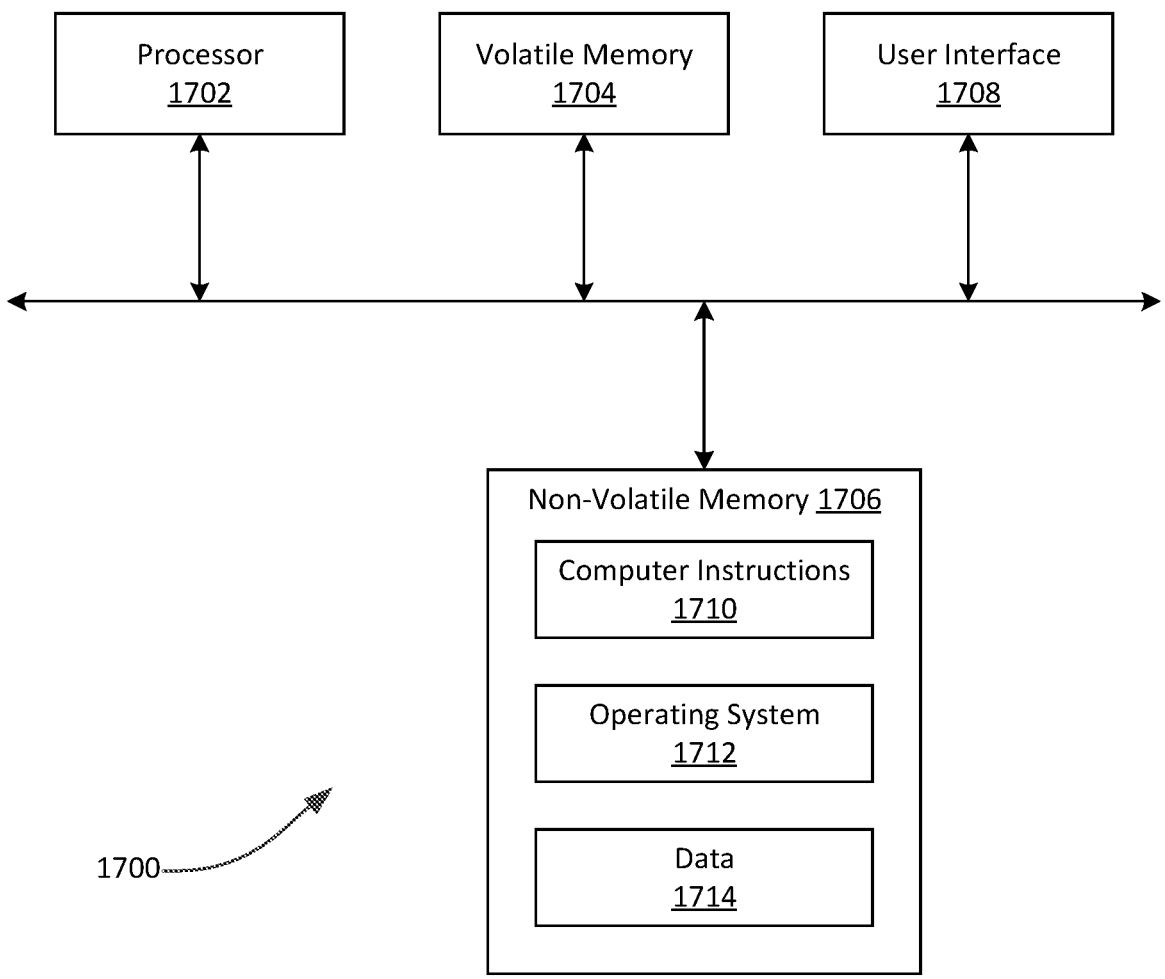
FIG. 17 schematically shows selective components of an illustrative computer system that may be used in accordance with an embodiment of the concepts, structures, and techniques disclosed herein.

FIG. 17 schematically shows selective components of an illustrative computer system 1700 that may be used in accordance with an embodiment of the concepts, structures, and techniques disclosed herein. As shown, computer system 1700 includes a processor 1702, a volatile memory 1704, a communication module 1706 (e.g., network chip or chipset which allows for communication via a network, a bus, an interconnect, etc.), and a non-volatile memory 1708 (e.g., hard disk or flash). Non-volatile memory 1708 stores an operating system 1710, computer instructions 1712, and data 1714. In one example, computer instructions 1712 are executed by processor 1702 out of volatile memory 1704 to perform all or part of the processes described herein (e.g., processes illustrated and described in reference to FIGS. 1 through 16).

These processes are not limited to use with particular hardware and software; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/ machines that each includes a processor, a non-transitory machine-readable medium or other article of manufacture that is readable by the processor (including volatile and non-volatile memory and/or storage elements), at least one input device, and one or more output devices. In embodiments, the processor can include ASIC, FPGA, and/or other types of circuits. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes of FIGS. 1 through 16 are not limited to the specific processing order illustrated. Rather, any of the processing blocks of the Figures may be re-ordered, combined or removed, performed in parallel or in serial, as necessary, to achieve the results set forth above.

The processing blocks associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device, or a logic gate. It is understood that embodiments of event synchronization are applicable to a variety of systems, objects and applications.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method to configure a volume that supports active-active bidirectional replication in an active-passive mode, the method comprising:
   creating, by a first site of the volume which supports active-active bi-directional replication, a local copy of the volume, the local copy of the volume configured to be active;
   enabling, by the first site of the volume, bidirectional write input/output (I/O) mirroring of the local copy of the volume with a second site of the volume which supports active-active bi-directional replication;
   creating, by the second site of the volume, a remote copy of the volume, the remote copy of the volume configured to be passive, wherein the remote copy of the volume does not service host read and write I/O requests when configured to be passive;
   enabling, by the second site of the volume, bidirectional write I/O mirroring of the remote copy of the volume configured to be passive with the first site of the volume; and
   exposing, by the second site of the volume, the remote copy of the volume to one or more hosts, wherein exposing the remote copy of the volume includes switching paths on the second site to disable write access.

2. The method of claim 1, further comprising exposing, by the first site of the volume, the local copy of the volume to one or more hosts.

3. The method of claim 1, wherein the creating, by the second site of the volume, a remote copy of the volume is in response to a request from the first site to create the volume on the second site.

4. The method of claim 1, further comprising mapping, by the second site of the volume, the remote copy of the volume to a host with no write access.

5. The method of claim 1, further comprising, responsive to a request to reconfigure the active-passive volume to an active-active volume, reconfiguring, by the second site of the volume, the remote copy of the volume to be active.

6. The method of claim 1, further comprising:
   responsive to a request to configure the remote copy of the volume on the second site as preferred:
      stopping, by the first site of the volume, acceptance of new host I/O requests;
      draining, by the first site of the volume, pending host I/O requests;
      switching, by the first site of the volume, paths on the first site to disable write access; and
      switching, by the second site of the volume, paths on the second site to enable write access.

7. The method of claim 1, further comprising, responsive to a request to promote the remote copy of the volume on the second site, switching, by the second site of the volume, paths on the second site to enable write access.

8. The method of claim 7, further comprising:
   responsive to a request to configure the promoted remote copy of the volume on the second site as preferred:
      sending, by the second site of the volume to the first site of the volume, a request to copy accumulated delta on the first site; and
      responsive to the request to copy the accumulated delta on the first site,
         copying, by the first site of the volume, the accumulated delta to the volume on the first site; and
         configuring, by the first site of the volume, paths on the first site to disable write access.

9. A computer program product including one or more non-transitory machine-readable mediums encoding instructions that when executed by one or more processors cause a process to be carried out to configure a volume that supports active-active bidirectional replication in an active-passive mode, the process comprising:
   creating, by a first site of the volume which supports active-active bi-directional replication, a local copy of the volume, the local copy of the volume configured to be active;
   enabling, by the first site of the volume, bidirectional write input/output (I/O) mirroring of the local copy of the volume with a second site of the volume which supports active-active bi-directional replication;
   creating, by the second site of the volume, a remote copy of the volume, the remote copy of the volume configured to be passive, wherein the remote copy of the volume does not service host read and write I/O requests when configured to be passive;
   enabling, by the second site of the volume, bidirectional write I/O mirroring of the remote copy of the volume configured to be passive with the first site of the volume; and
   exposing, by the second site of the volume, the remote copy of the volume to one or more hosts, wherein exposing the remote copy of the volume includes switching paths on the second site to disable write access.

10. The computer program product of claim 9, wherein the process further comprises exposing, by the first site of the volume, the local copy of the volume to one or more hosts.

11. The computer program product of claim 9, wherein the creating, by the second site of the volume, a remote copy of the volume is in response to a request from the first site to create the volume on the second site.

12. The computer program product of claim 9, wherein the process further comprises mapping, by the second site of the volume, the remote copy of the volume to a host with no write access.

13. The computer program product of claim 9, wherein the process further comprises, responsive to a request to reconfigure the active-passive volume to an active-active volume, reconfiguring, by the second site of the volume, the remote copy of the volume to be active.

14. The computer program product of claim 9, wherein the process further comprises:
   responsive to a request to configure the remote copy of the volume on the second site as preferred:
      stopping, by the first site of the volume, acceptance of new host I/O requests;
      draining, by the first site of the volume, pending host I/O requests;
      switching, by the first site of the volume, paths on the first site to disable write access; and
      switching, by the second site of the volume, paths on the second site to enable write access.

15. The computer program product of claim 9, wherein the process further comprises, responsive to a request to promote the remote copy of the volume on the second site, switching, by the second site of the volume, paths on the second site to enable write access.

16. The computer program product of claim 15, wherein the process further comprises:
   responsive to a request to configure the promoted remote copy of the volume on the second site as preferred:
      sending, by the second site of the volume to the first site of the volume, a request to copy accumulated delta on the first site; and
      responsive to the request to copy the accumulated delta on the first site,
         copying, by the first site of the volume, the accumulated delta to the volume on the first site; and
         configuring, by the first site of the volume, paths on the first site to disable write access.

17. A system comprising:
   one or more non-transitory machine-readable mediums configured to store instructions; and
   one or more processors configured to execute the instructions stored on the one or more non-transitory machine-readable mediums, wherein execution of the instructions causes the one or more processors to:
      create, by a first site of the volume that supports active-active bidirectional replication, a local copy of the volume, the local copy of the volume configured to be active;
      enable, by the first site of the volume, bidirectional write input/output (I/O) mirroring of the local copy of the volume with a second site of the volume which supports active-active bi-directional replication;
      create, by the second site of the volume, a remote copy of the volume, the remote copy of the volume configured to be passive, wherein the remote copy of the volume does not service host read and write I/O requests when configured to be passive;
      enable, by the second site of the volume, bidirectional write I/O mirroring of the remote copy of the volume configured to be passive with the first site of the volume; and
      expose, by the second site of the volume, the remote copy of the volume to one or more hosts, wherein to expose the remote copy of the volume includes switching paths on the second site to disable write access.

18. The system of claim 17, wherein execution of the instructions further causes the one or more processors to:
   expose, by the first site of the volume, the local copy of the volume to one or more hosts.

* * * * *